US010970659B1

(12) United States Patent
Saini et al.

(10) Patent No.: US 10,970,659 B1
(45) Date of Patent: Apr. 6, 2021

(54) TASKING SYSTEM

(71) Applicant: Hipaax L.L.C., Mason, OH (US)

(72) Inventors: Bharat A. Saini, Mason, OH (US); Vivek B. Saini, Mason, OH (US)

(73) Assignee: Hipaax L.L.C., Mason, OH (US)

( * ) Notice: Subject to any disclaimer, the term of this patent is extended or adjusted under 35 U.S.C. 154(b) by 195 days.

(21) Appl. No.: 15/898,883

(22) Filed: Feb. 19, 2018

Related U.S. Application Data

(63) Continuation-in-part of application No. 14/642,991, filed on Mar. 10, 2015, now abandoned.

(51) Int. Cl.
| G06Q 10/00 | (2012.01) |
| H04W 4/00 | (2018.01) |
| G05B 15/00 | (2006.01) |
| G06Q 10/06 | (2012.01) |
| H04W 4/12 | (2009.01) |
| H04W 4/029 | (2018.01) |
| G05B 15/02 | (2006.01) |

(52) U.S. Cl.
CPC ........... *G06Q 10/063114* (2013.01); *G06Q 10/063112* (2013.01); *H04W 4/029* (2018.02); *H04W 4/12* (2013.01); *G05B 15/02* (2013.01)

(58) Field of Classification Search
CPC ...... G06Q 10/00–50/00; H04W 4/029; H04W 4/12; G05B 15/02
USPC ............................................... 705/7.11–7.42
See application file for complete search history.

(56) References Cited

U.S. PATENT DOCUMENTS

| 8,938,222 | B2 | 1/2015 | Morohoshi | |
| 9,779,375 | B2 | 10/2017 | Grabovski et al. | |
| 10,108,783 | B2 * | 10/2018 | Horseman | G06F 19/3418 |
| 2003/0139955 | A1 * | 7/2003 | Kirii | G06Q 10/063114 |
| | | | | 705/7.15 |
| 2003/0204431 | A1 | 10/2003 | Ingman | |
| 2007/0067200 | A1 * | 3/2007 | Patel | G06Q 10/06 |
| | | | | 705/7.14 |
| 2008/0033780 | A1 | 2/2008 | Lee et al. | |
| 2009/0037241 | A1 | 2/2009 | Olsen | |
| 2009/0284348 | A1 * | 11/2009 | Pfeffer | G08B 25/006 |
| | | | | 340/7.3 |
| 2010/0036667 | A1 * | 2/2010 | Byford | G16H 40/20 |
| | | | | 704/270 |
| 2011/0117878 | A1 * | 5/2011 | Barash | H04W 4/90 |
| | | | | 455/404.2 |
| 2011/0202351 | A1 | 8/2011 | Plocher | |
| 2014/0002241 | A1 * | 1/2014 | Elghazzawi | H04W 4/023 |
| | | | | 340/8.1 |
| 2014/0136255 | A1 | 5/2014 | Grabovski et al. | |
| 2014/0278627 | A1 | 9/2014 | Grabovski et al. | |
| 2014/0337074 | A1 * | 11/2014 | Taylor | G06Q 30/018 |
| | | | | 705/7.13 |
| 2015/0302340 | A1 | 10/2015 | Dasgupta et al. | |
| 2015/0317582 | A1 | 11/2015 | Nath et al. | |

\* cited by examiner

*Primary Examiner* — Alan S Miller
*Assistant Examiner* — Mustafa Iqbal
(74) *Attorney, Agent, or Firm* — Mark F. Smith; Smith Brandenburg Ltd

(57) ABSTRACT

The current invention is a tasking system that operates to allow businesses to define a task and to assign the task to one or more registered individuals, wherein the system includes one or more portable communication apparatus that permits registered individuals to receive and accept tasks and to monitor tasks in real-time.

21 Claims, 15 Drawing Sheets

US 10,970,659 B1

TASKING SYSTEM

CROSS-REFERENCE TO RELATED APPLICATION

The present invention is a continuation-in-part of U.S. patent application Ser. No. 14/642,991, filed Mar. 10, 2015 entitled: Tasking System and is incorporated herein in its entirety.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records. The copyright owner, however, otherwise reserves all copyright rights whatsoever.

BACKGROUND OF THE INVENTION

The present invention relates to computer-aided interactive tasking system and more particularly to a computer-aided interactive tasking system that provides a collaborative process in which users, such as individual support members and administrative members (collectively referred to as "users"), can coordinate the performance of certain tasks.

Many businesses today, particularly large businesses, have a multitude of individuals that operate on the premises and large building centers and are responsible for performing various tasks. One problem with such business (such as hospitals, stores, warehouses, manufacturing plants, and other similar places) is that it is difficult for them to monitor the performance of such tasks as well as monitoring the location of individuals, obtaining the status of individuals, and the scheduling and the availability of individuals. In addition, businesses will often require individuals, such as sales clerks and associates, to be on the floor for interacting and providing services to customers. Unfortunately, it is often difficult to locate an individual on a sales floor or to determine the individual's availability to interact with a customer. Further, such individuals are often not at their work site or location, such as when the individual decides to have lunch or take a break.

Businesses also have tasks that are must be performed by individuals at different times and locations. For example, often these tasks are not performed because the individual assigned to the task is diverted from the task, such as to perform another task. Accordingly, it is difficult for management to know if an assigned task has been completed or to if a task should be assigned to another individual. While systems have been developed for individuals to report the status of tasks, such systems are often inconvenient for use by an individual and therefore are often not used. Further, while such systems may allow management to monitor if a task has been performed, if a task has not been performed such systems do not allow management to locate and/or select another individual that is capable of performing the task or is available and in a location that allows the task to be performed efficiently and without increasing the likelihood that another task does not get completed.

Accordingly, what is needed is a tasking system, particular adapted for use by businesses in which individuals and management can interact, monitor tasks, can utilize current and planned location of individuals and schedules, as well as provide information and communication allowing a business to optimize employee performance.

SUMMARY OF THE INVENTION

The current invention is a tasking system that uses various communication modems to allow management to interact with registered individuals and to assign, track and monitor tasks. In a preferred embodiment of the invention, the tasking system comprises an administration control system that interacts with an administrator and operates to communicate with one or more registered individuals each having a communication apparatus capable of entering and receiving information, such as tasking information and/or individual information. The administration control system comprises a processor that operates system software that functions to permit information to be entered into the tasking system by the administrator and to transfer and receive information to and from each communication apparatus.

In a preferred embodiment of the invention the information comprises a specific task to be performed, the registered individual responsible for performing the specific task, and the status of the specific task.

In another preferred embodiment of the invention a task is defined and inputted into the tasking system and a registered individual qualified and available for performing the task is assigned.

In a preferred embodiment of the invention the tasking system operates such that the registered individual assigned to a task can accept a task or decline the task and the system software operates to assign the task to another registered individual who is qualified and available to perform the task.

In a preferred embodiment of the invention the system software operates to assign the task to all registered individuals who are qualified and available to accept responsibility of performing the task.

In a preferred embodiment of the invention the system software operates to monitor the status of each task.

In a preferred embodiment of the invention the system software operates to assign each task a priority.

In a preferred embodiment of the invention the system software operates to assign each task with a completion time (target time) and if the task is not completed by the target time, the task expires for that registered individual and gets reassigned to another registered individual.

In a preferred embodiment of the invention the communication apparatus is a hands-free device.

In a preferred embodiment of the invention one or more of the communication apparatus is in the form of a portable communication apparatus.

In a preferred embodiment of the invention the portable communication apparatus is in the form of a wrist watch.

In a preferred embodiment of the invention the portable communication apparatus includes one or more environmental sensors that operate with the control unit to obtain environmental information and transmit the environmental information to the administrative control system.

In a preferred embodiment of the invention the administrative control system operates to receive environmental information and compares the environmental information with a reference and transmits an alert notice if the environmental information is outside a predefined environmental tolerance.

In a preferred embodiment of the invention the portable communication apparatus includes one or more biological sensors that operate with the control unit to obtain biological information and transmit the environmental information to the administrative control system.

In a preferred embodiment of the invention the administrative control system operates to receive biological information and compares the environmental information with a reference and transmits an alert notice if the biological information is outside a predefined biological tolerance.

In a preferred embodiment of the invention the portable communication apparatus of a registered individual is a voice activated device that operates to receive information from the administrative control system and broadcast the information such that the information is communicated to the registered individual in verbal form.

In a preferred embodiment of the invention the portable communication apparatus of a registered individual to receive verbal information from the registered individual and transmit the verbal information to the administrative control system.

In a preferred embodiment of the invention the portable communication apparatus of a registered individual operates to receive verbal information from the registered individual and transmit the verbal information to one or more other registered individuals.

In a preferred embodiment of the invention the portable communication apparatus of a registered individual includes an event switch that when activated operates direct a recording module in the portable communication apparatus to record audio information at the location of the portable communication apparatus.

In a preferred embodiment of the invention the portable communication apparatus of a registered individual includes an event switch that operates to direct the transmitter module of the portable communication apparatus to transmit a request for assistance to the administrative control system.

In a preferred embodiment of the invention the portable communication apparatus of the registered individual includes an event switch that operates to direct the transmitter module of the portable communication apparatus to transmit a request for assistance to one or more other registered individual portable communication apparatus.

In a preferred embodiment of the invention the tasking system includes a plurality of portable communication apparatus that operate together to create a wireless communication system that operates such that a registered individual within a defined area can directly communicate with one or more other registered individuals within the defined area.

In a preferred embodiment of the invention the tasking system includes a tracking system having one or more nodes positioned within a defined area that operate to receive signals from a portable communication apparatus to identify a registered individual within a defined area.

In a preferred embodiment of the invention the administrative control system is in communication with one or more sensors that cooperate to define a task.

In a preferred embodiment of the invention the tracking system includes a GPS system that provides the specific location of an individual.

In another preferred embodiment of the invention the tasking system operates to allow registered individuals and the administrator to send and receive location information.

In another preferred embodiment of the invention, the tasking system includes a tracking system that operates to identify an individual within an area that is registered with the tasking system.

In another preferred embodiment of the invention, the tracking system operates to establish communication with a registered individual's portable communication apparatus when the registered individual enters or is in a predetermined range within the defined area and further functions to monitor and transmit the arrival and departure of the registered individual.

In a preferred embodiment of the invention the tracking system includes one or more nodes that function to receive short-range wireless communication emitted signals or probe requests being emitted from the individual's portable communication apparatus.

In another preferred embodiment of the invention the tasking system includes a communication link for connecting the administrative control system and each portable communication apparatus.

In a preferred embodiment of the invention the communication link includes a communication connection to permit the tasking system to receive and transmit information to an outside network.

In another preferred embodiment of the invention the communication link cooperates with the system software to create a display having one or more interactive windows for receiving and entering information.

In another preferred embodiment of the invention information of a registered individual entered into the tasking system comprises an individual's real-time location, availability, qualifications, schedule, and other information.

A preferred embodiment of the invention is a method of assigning and monitoring the status of a task to one or more individuals comprising the steps of: an administrator using an administrative control system inputs information that identifies one or more registered individuals within a network to be notified of a scheduled task, the task to be performed and the time to transmit a notification to the one or more registered individuals, wherein each one or more registered individuals having a portable communication apparatus; using the notification instructions, system software monitors time and identifies one or more registered individuals to receive the notification and sends the notification at the time to transmit the notification to the portable communication apparatus of each one or more registered individuals identified to receive the notification; once the one or more registered individuals have received the notification, the one or more registered individuals accepts or rejects the task using the portable communication apparatus; and the system software displays the task and the registered individual who accepted the task on the administrative control system.

In a preferred embodiment of the invention, the method of further comprises the step of the one or more registered individual who accepted the task inputs information into the tasking system using the individual's portable communication apparatus.

In another preferred embodiment of the invention the method further comprises the step whereby if the task has not been completed within a specified time limit, the system software receives information inputted by the one or more registered individuals assigned to the task using the individual's portable communication apparatus, the system software automatically assigns the task to another one or more registered individual and notifies the another one or more registered individual using the one or more individual's portable communication apparatus.

In another preferred embodiment of the invention, the method includes the step whereby the administrative control system communicates with one or more sensors that cooperate to define a task.

In another preferred embodiment of the invention, the method includes the step whereby the administrative control system receives information from one or more sensors and a tracking system that provides the specific location of the one or more registered individuals.

These and other benefits, advantages, and embodiments of the invention will be apparent from the following description, the accompanying drawings and the appended claims.

BRIEF DESCRIPTION OF THE DRAWINGS

Features, aspects, and advantages of the present invention will become better understood with regard to the following description, appended claims, and accompanying drawings where:

DETAILED DESCRIPTION OF THE PREFERRED EMBODIMENT

Figure 1:
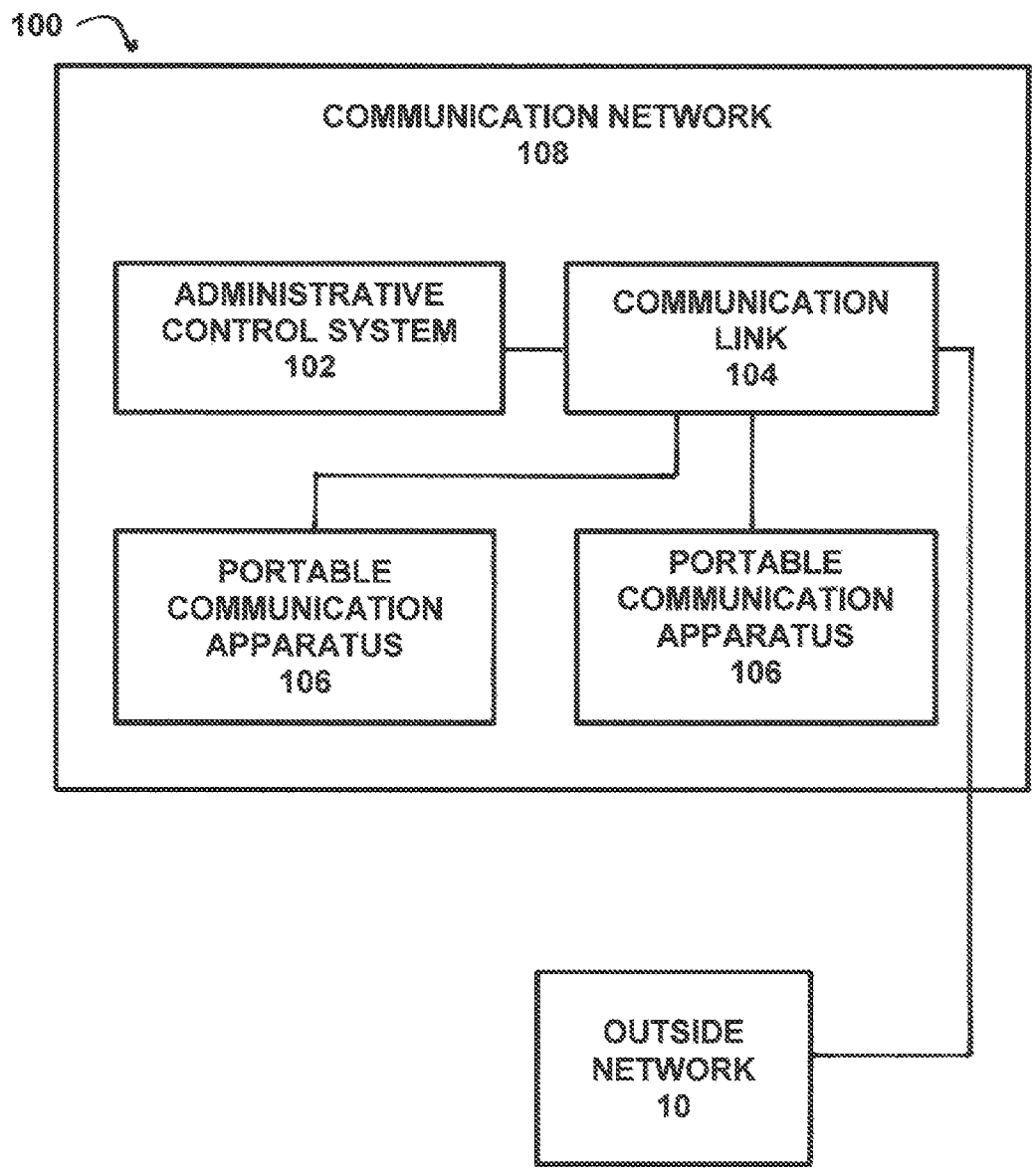
FIG. 1 is a schematic representation of the tasking system of the subject invention showing the administrative control system that interacts with an administrator and operates to communicate with one or more registered individuals each having a portable communication apparatus.

The present invention solves the prior art problems discussed above and provides a distinct advance in the state of the art. The tasking system of the present invention preferably is a computer-aided system that operates to provide a collaborative structure, whereby registered individuals, such as floor personnel, can receive and input tasking information, such as one or more tasks to be performed, task status, and individual information, such as the location and status and working schedule of a registered individual who is responsible and qualified for performing the one or more tasks. The system operates to transmit such tasking information and individual information to administrators and registered individuals via an electronic connection, such as by way of internal networks capable of transmitting information electronically to users.

In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. Further, as used herein, the terms "administrator" means one that inputs, amends, and monitors information and tasks to be performed using the administration control system. The terms "registered individual" and "registered individuals" refer to individual(s) that have or use portable communication devices in communication with the administration control system and whereby the individuals are identified as being authorized to communicate with the administrative control system and whereby the administration control system has individual information for the individual stored in the memory of the administrative control system. The term "user" or "users" refer collectively to administrators and registered individuals who are using the tasking system. As used herein, the term "information" refers to individual information and/or tasking information.

Preferably, the tasking system of the subject invention includes a communication link that cooperates with an administrative control system utilizing system software to create an interactive, menu and event driven structure for using conventional prompt, dialog, and entry windows to guide a user, such as the administrator and registered individuals, to enter and receive information. In another preferred embodiment, the communication link includes a communication connection to an internal network or to an outside network, such as the Internet that operates to receive and transmit information.

The tasking system of the present invention provides means whereby the location of registered individuals (such as for a non-limiting example: sales clerks and associates, warehousing employees, waiters and waitresses, medical personnel and other registered individuals) within a tasking network can be located and/or tracked. Preferably, the tasking system includes a communication link that cooperates with a registered individual's communication apparatus that allows an administrator to input individual information, such as a registered individual's assigned location and the individual's schedule into the tasking system as well as to review such information and preferably review any special qualifications of a registered individual. The registered individual's communication apparatus operates to allow the registered individual to input individual information, such as additional information or updates or modifications to the individual information into the tasking system. The tasking system further includes a communication link that cooperates with a tracking system, such as a conventional internal system or a system having sensors and/or sensor nodes or a conventional GPS system, that automatically transmits a registered individual's location to a data bank that can be accessed by the administrator or system software to determine the qualifications, such as the availability and/or location, of a registered individual for performing a task. The administrative control system is in communication with one or more sensors or sensor nodes that provide input for use by the tasking system in identifying qualified registered individuals, defining and assigning tasks. It should also be understood that in addition to assigning tasks to registered individuals based on the registered individual's location, in a preferred embodiment, tasks are assigned based on a schedule, such as a business schedule (when tasks need to be completed) and/or the schedule of the registered individual who can perform the task. For example, a specific registered individual or individuals may be assigned to a specific defined area, such as a specific work area or department. When a notification for a task is transmitted, such as to assign a task to be completed within a specific defined area, the administrative control system operates to identify and assign or notify a registered individual or individuals assigned to the defined area or in a defined area or nearest the defined area or who is scheduled to be within the defined area. These and other embodiments and benefits are more fully described herein below.

Referring to FIG. 1, the tasking system 100 of the subject application comprises an administrative control system 102 for implementing and operating the system software 200 (FIG. 3) that performs a portion of the method of the subject invention. The tasking system 100 further comprises a communication link 104 electronically coupled to the administrative control system 102 and operates to assess, receive, retrieve, and transmit information to or from one or more individual communication apparatus 106, such as a portable communication apparatus (PCA), that together define a communication network 108. It should be understood that the one or more communication apparatus can be portable (mobile) in that it is not assigned to a fixed location or it can be a stationary device. Preferably, the communication link 104 is a wireless system having a server or other similar device for creating wire-free communication between the administrative control system 102 and the one or more individual communication apparatus 106 within the communication network 108. In another preferred embodiment, the communication link 104 is connected to one or more outside networks 10, such as the Internet or any other suitable system that operates as a general portal for receiving and transmitting information from and to the outside network 10.

Figure 2:
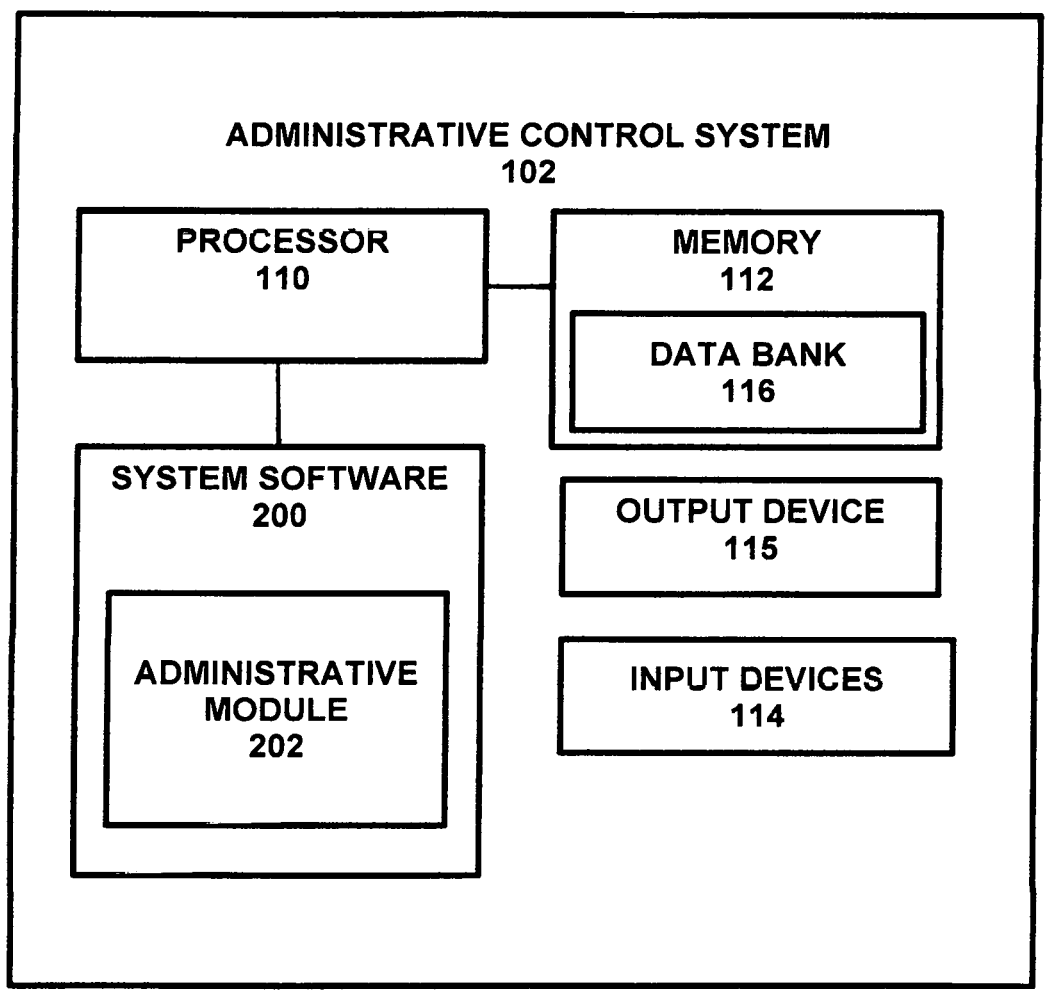
FIG. 2 is a schematic representation of the tasking system of FIG. 1 showing the administrative control system having a processor and memory and a server for having a communication connector for communication with outside networks.

As shown in FIG. 2, the administrative control system 102 further includes a processor 110 and a memory 112 that may be electronically coupled to other system devices, such as one or more suitable administrative input devices 114 (i.e. a keypad, touch screen, and other suitable input devices capable of entering information into a computer or similar device) or output devices 115 (i.e. a display, printer, or other suitable output devices capable of display information from a computer or other similar device). It should be understood that the administrative control system 102 can include any combination of the above components, or any number of different components, peripherals, and other devices.

Preferably, the administrative computer system 102 operates under the control of an operating system, such as, but not limited to, the WINDOWS operating system developed by Microsoft Corporation or the MACINTOSH operating system developed by Apple Computer Corporation, or the ANDROID operating system developed by Google, Inc., or the TIZEN operating system developed by the Tizen Association. It should be understood, however, that other operating systems could be utilized to implement the system software 200 of the tasking system 100 of the present invention. In a preferred embodiment, the administrative control system 102 is preferably configured such that the communication link 104 is electronically coupled to the communication systems, such as a DSL modem or a cable modem, a T-1 line, a ISDN line, or the like, for connecting to an outside network 10. The system software 200, preferably also includes conventional browser software suitable for allowing communications over the outside network 10, such as the Internet, that permits the administrative control system 102 to receive and transfer information.

Figure 3:
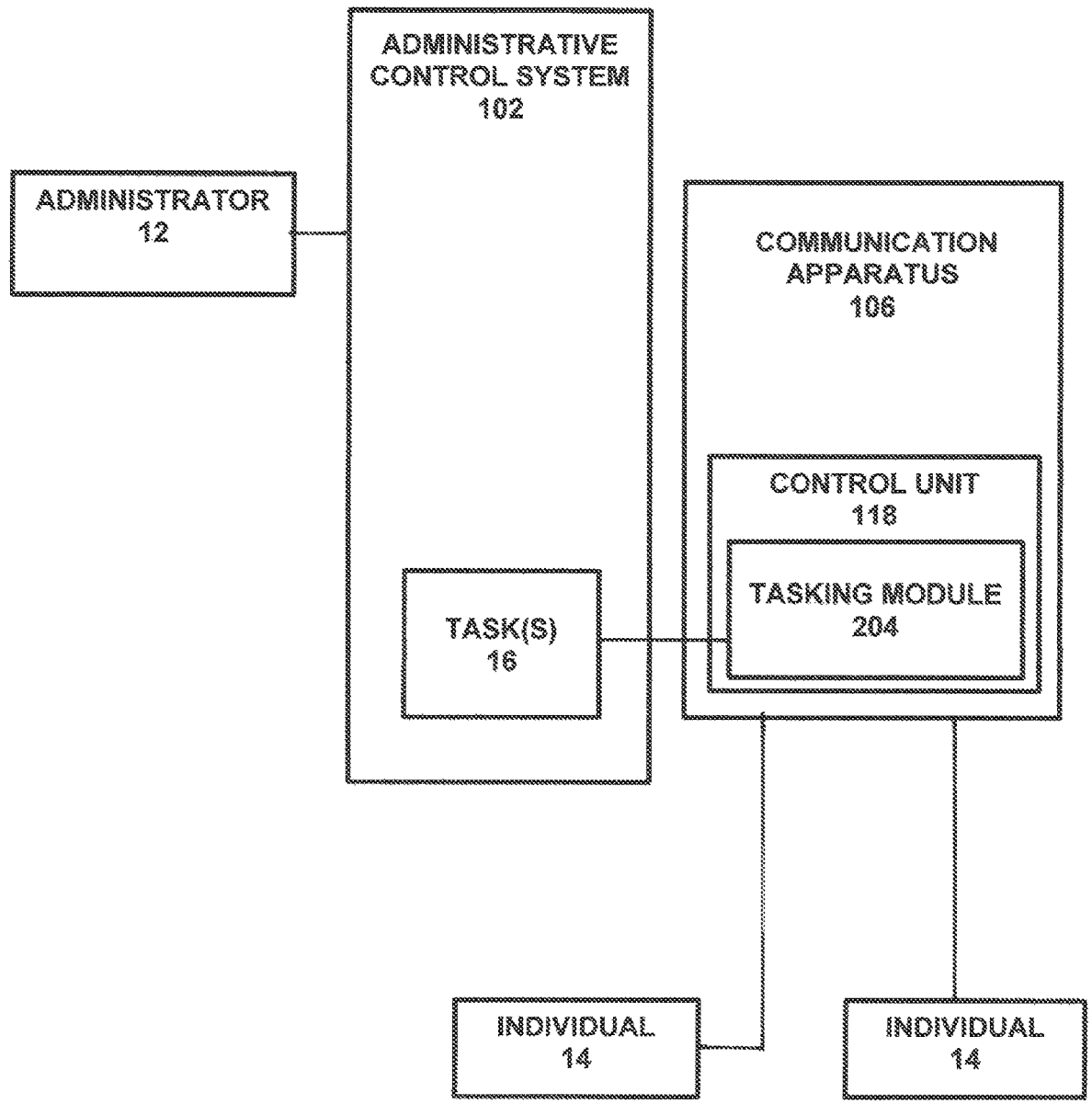
FIG. 3 illustrates the general methodology of a preferred embodiment of the system software of the administrative control system.

FIGS. 2 and 3 illustrates the methodology of the system software 200 of the tasking system 100 of the present invention. As shown, the system software 200 comprises an administrative module 202 that operates using the processor 110 that interacts with a data bank 116 within the memory 112 of the administrative control system 102, and with a tasking module 204 that operates within a control unit 118 of each individual communication apparatus 106. Together, the administrative module 202 and the tasking module 204 operate to permit an administrator 12 and registered individuals 14 to communicate information as well as monitoring the status of each registered individual 14 and assigned tasks 16 (or tasks to be assigned) and transmitting such information to the administrative control system 102.

The system software 200 is a computer-readable medium having computer-readable instructions for performing a method of operating the tasking system 100 and operates as an interactive, menu and event driven system that cooperates with the communication link 104. In operation the system software 200 operates to create conventional prompt, dialog, and entry windows to guide the administrator and/or registered individuals to enter information thereby providing an interactive communications interface for facilitating communications and information exchange between the administrator 12 and registered individuals 14 using the tasking system 100. As used herein, it should be understood that the term "software" refers to any form of programmed machine-readable language or instructions (e.g., object code) that, when loaded or otherwise installed, provides operating instructions to a machine capable of reading those instructions, such as a computer. The system software 200 of the present invention can be stored or reside on, as well as be loaded or installed from, one or more floppy disks, CD ROM disks, hard disks or any other form of suitable non-volatile electronic storage media. The system software 200 can also be installed by downloading or other form of remote transmission, such as by using Local or Wide Area Network (LAN or WAN)-based, Internet-based, web-based or other remote downloading or transmission methods.

As shown, the administrative control system 102 uses the administrative module 202 and the tasking module 204 which work together to provide an interface between the administrator 12 and registered individuals 14 utilizing their respective input/output devices for electronically inputting and receiving information as will be described herein below.

Figure 4:
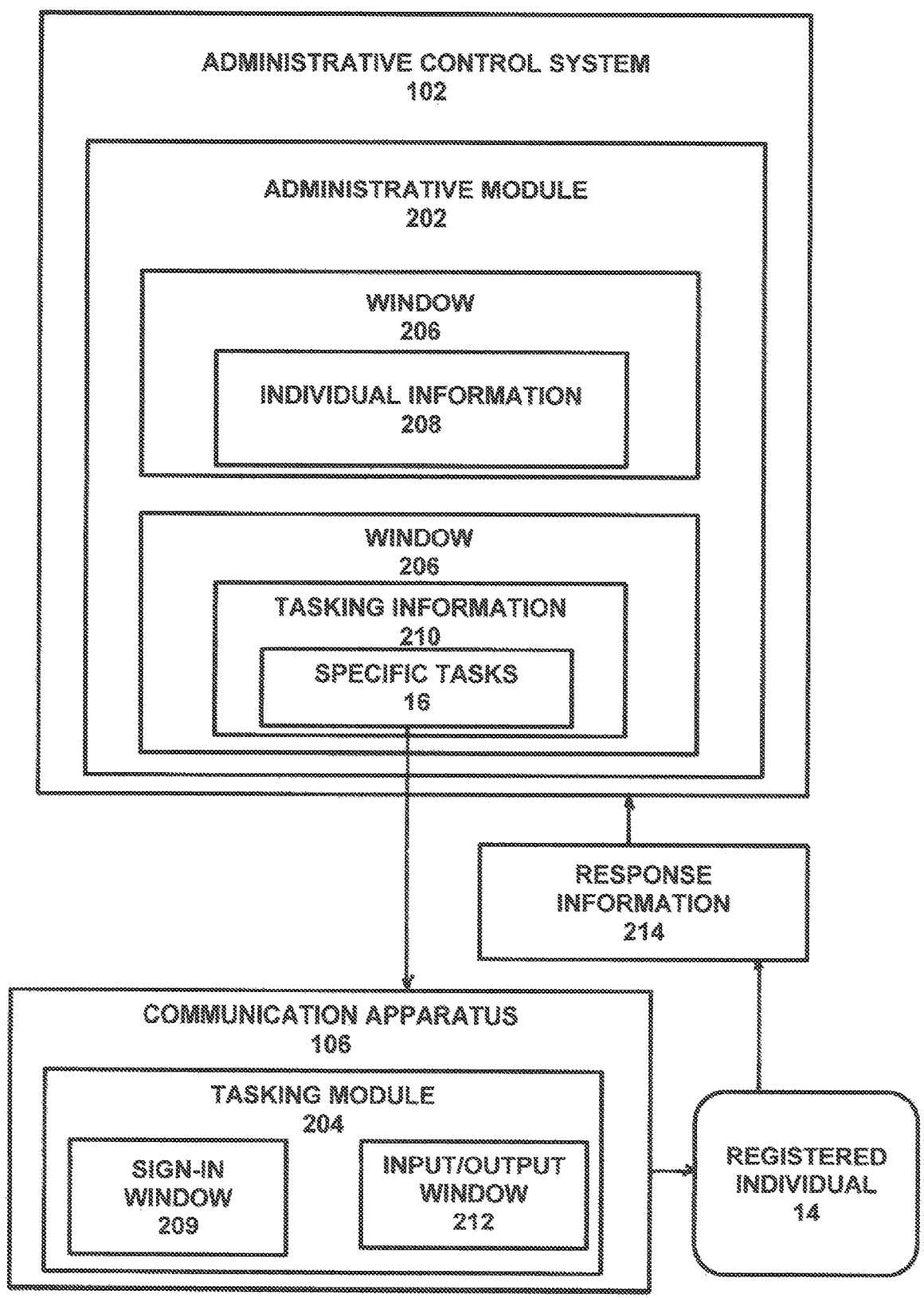
FIG. 4 is a schematic illustration of an exemplary display generated by the system software and having windows for inputting information and for receiving and transferring information.

Referring to FIGS. 3 and 4, the administrative module 202 of the system software 200 operates to direct, create and display on the administrative control system 102 one or more input and output windows 206 for allowing the administrator 12 to input individual information 208 into the tasking system 100. The system software 200 than operates to direct the storing of the individual information 208 into the data bank 116 (FIG. 2) and to perform other specific operations as more fully described herein.

In a preferred embodiment of the invention, the administrative module 202 of the system software 200 operates to create, display the input and output windows 206 that provide the administrator 12 with various options for inputting individual information 208 into the system 100 and for storing the individual information 208 in the data bank 116 of the memory 112 and processor 110 of the administrative control system 102. In a preferred embodiment, the individual information 208 may consist of, but not limited to, a registered individual's name, qualifications, current location, and scheduling information. Depending on the particular registered individual's information 208, the system software 200 directs the communication link 104 to transmit individual information 208 to the communication apparatus 106 of the registered individual 14.

In a preferred embodiment, a registered individual 14 can sign into the tasking system 100 such by be entering a registered individual's identification number and a security password by inputting sign-in information into the appropriate sign-in window 209 displayed on the registered individual's communication apparatus 106. Once signed-on into the tasking system 100, any individual information 208 directed to that registered individual 14, as well as tasking information 210, is transmitted to the registered individual's communication apparatus 106 through the communication link 104. Preferably, as stated, tasking information 210 can include various types of information which preferably includes, but not limited to, identified registered individuals qualified to be assigned to perform a task, the details of the task to be performed, and the date and/or time to perform and/or complete the task, and any specific information or instructions relating to the task.

In a preferred embodiment the administrative module 202 of the system software 200 operates to create and display one or more input/output windows 206 that permit the administrator 12 to input individual information 208 and/or tasking information 210 into the tasking system 100. Preferably, when accessed, the computer software 200 operates to prompt the administrator 12 to enter specific individual information 206 and/or tasking information 210 into the appropriate input/output window 206. When inputted, the individual information 208 and tasking information 210 is stored in the data bank 116 of the memory 112.

After individual information 208 has been entered and stored using the tasking system 100, a registered individual 14 using the registered individual's assigned communication apparatus 106 can access the system 100 by way of the communication link 104. When tasking information 210 is transmitted to one or more registered individuals 14, the tasking module 204 of the system software 200 operates to direct the tasking module 204 to create and display one or more input/output windows 212 on each registered individual's 14 communication apparatus 108 who received the tasking information 210 to permit a registered individual 14 to enter individual response information 214 (such as but not limited to an acceptance or to decline the task and/or information concerning the acceptance by the registered individual to be assigned the task). The registered individual 14 can further input other response information 214 such as task status, when the task is expected to be performed, completion information, difficulties, and other relevant information which is transmitted to the administrative control system 102 using the communication link 104 and the registered individual's communication apparatus 106.

Figure 12:
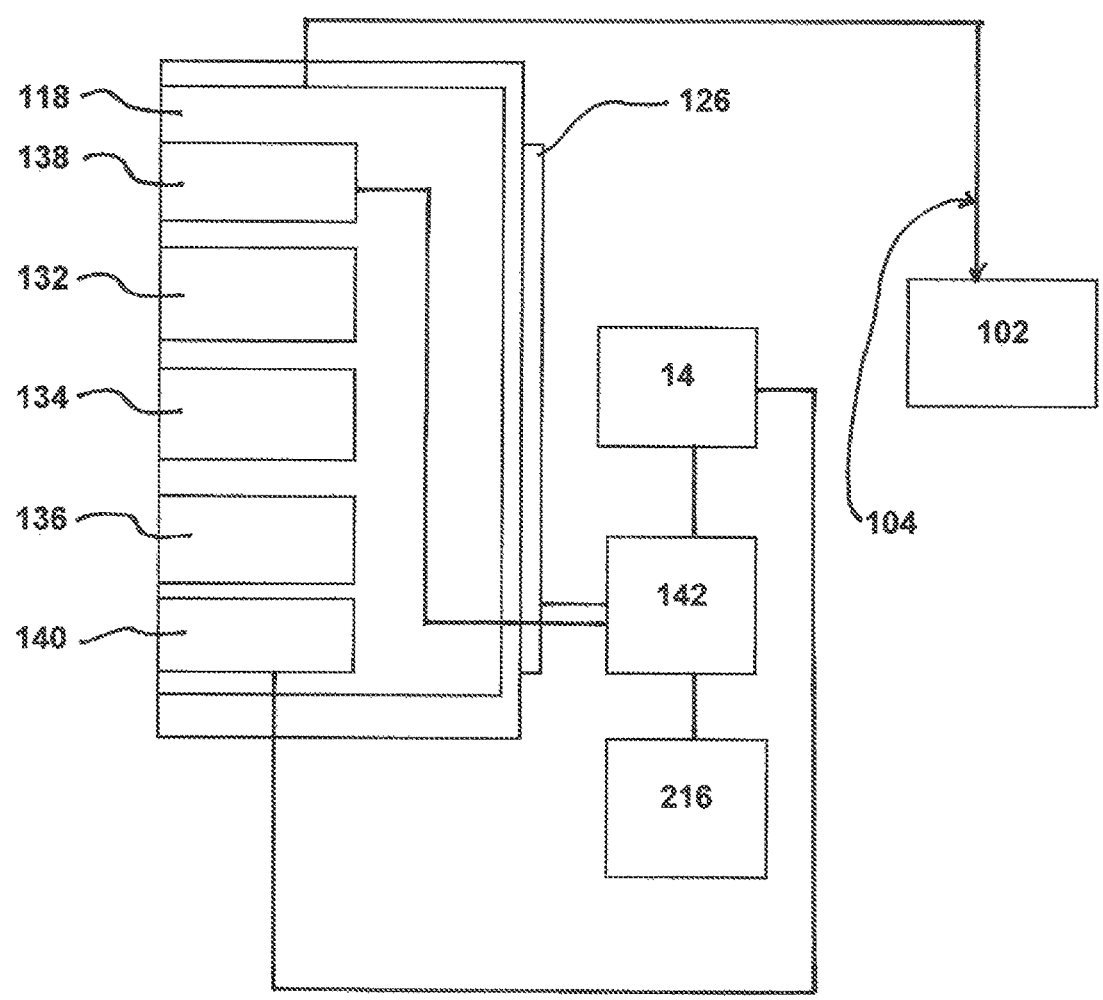
FIG. 12 is a schematic side illustration of a portable communication apparatus that operates to receive a sound signal indicating that a notice or tasking information is being displayed or can be heard by the registered individual using the built-in speaker.

An exemplary illustration of the operation of the tasking system 100 is shown whereby the administrator 12 inputs individual information 208 into the administrative control system 102 which is stored in the data bank 116 of the memory 112. Tasking information 210, such as specific tasks 16 that need to be performed, or the registered individuals 14 identified as being qualified to perform a specific task can then be sent to the identified registered individuals. The administrative control system 102 operates to identify one or more registered individuals 14 based on the individual information 208 and the tasking information 210 and transmits the tasking information 210 to the identified one or more registered individual(s) 14 using the communication link 104 and the tasking module 204 which operates to display the information on the identified registered individual's communication apparatus 106. In this illustration the task information 210 in addition to the specific task 16 to be performed includes additional detail such as how a certain task should be performed, time that the task is to be performed and/or completed ("target time"), task priority, task scheduling, and other pertinent information. Once received, an identified registered individual 14 can then review the task information 210 using the registered individual's communication apparatus 106 and can accept or reject the assignment of the specific task 16. In another preferred embodiment, as illustrated in FIG. 12, if the registered individual 14 who accepted the task and was assigned to a task (assigned registered individual) is unable to complete the task within the target time, the administrative control system 102 operates such that the a notice 216 is sent to the assigned registered individual 14 that the acceptance (assignment) of the task has expired and other identified registered individuals 14 (alternate identified registered individuals) are sent task information 210 which is displayed on the alternate identified registered individuals communication apparatus 106 and the alternate identified registered individual 14 can then accept or reject the assignment of the task 16.

Figure 5:
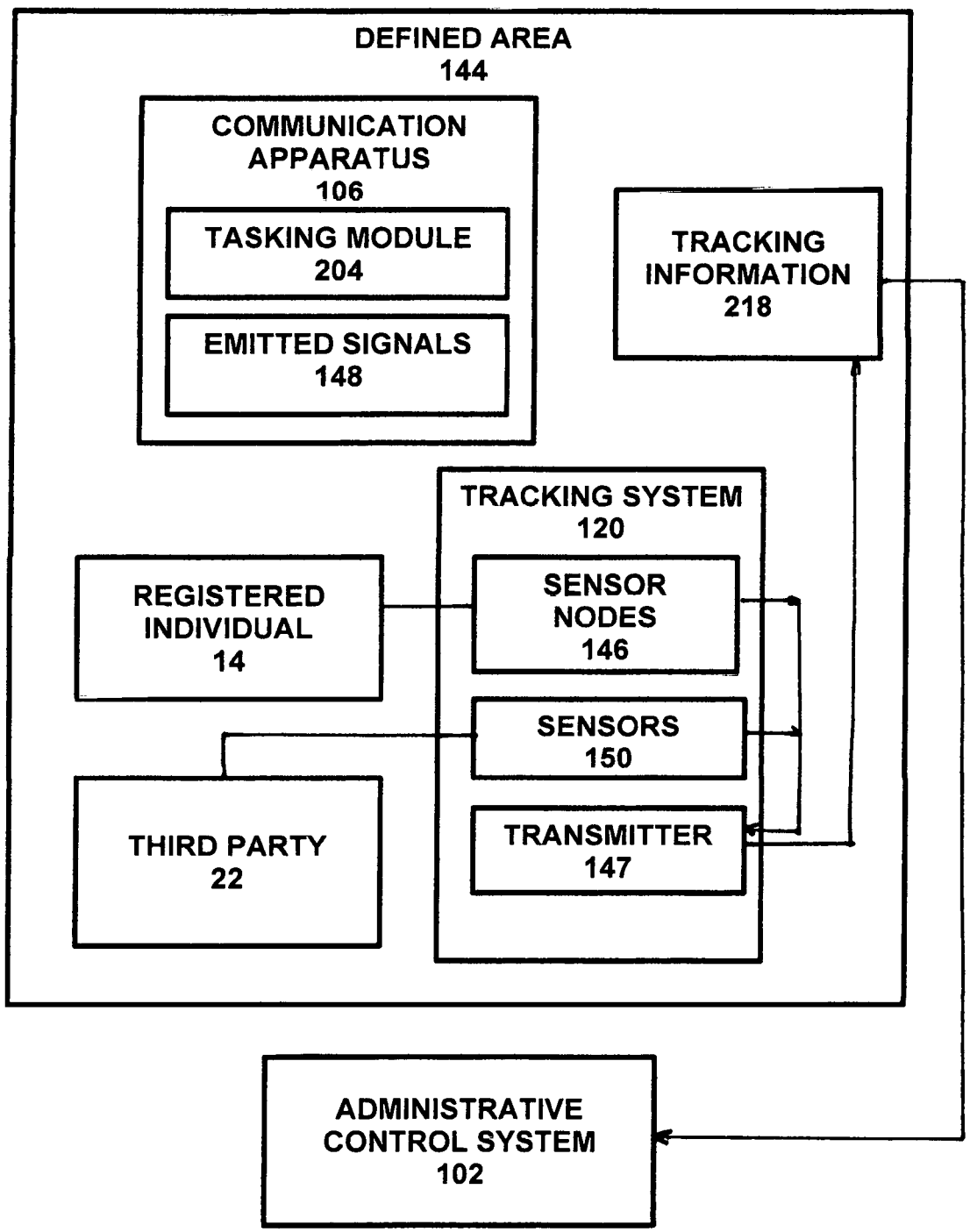
FIG. 5 is a schematic illustration of an exemplary portable communication apparatus having a tasking module and a tracking system.
Figure 13:
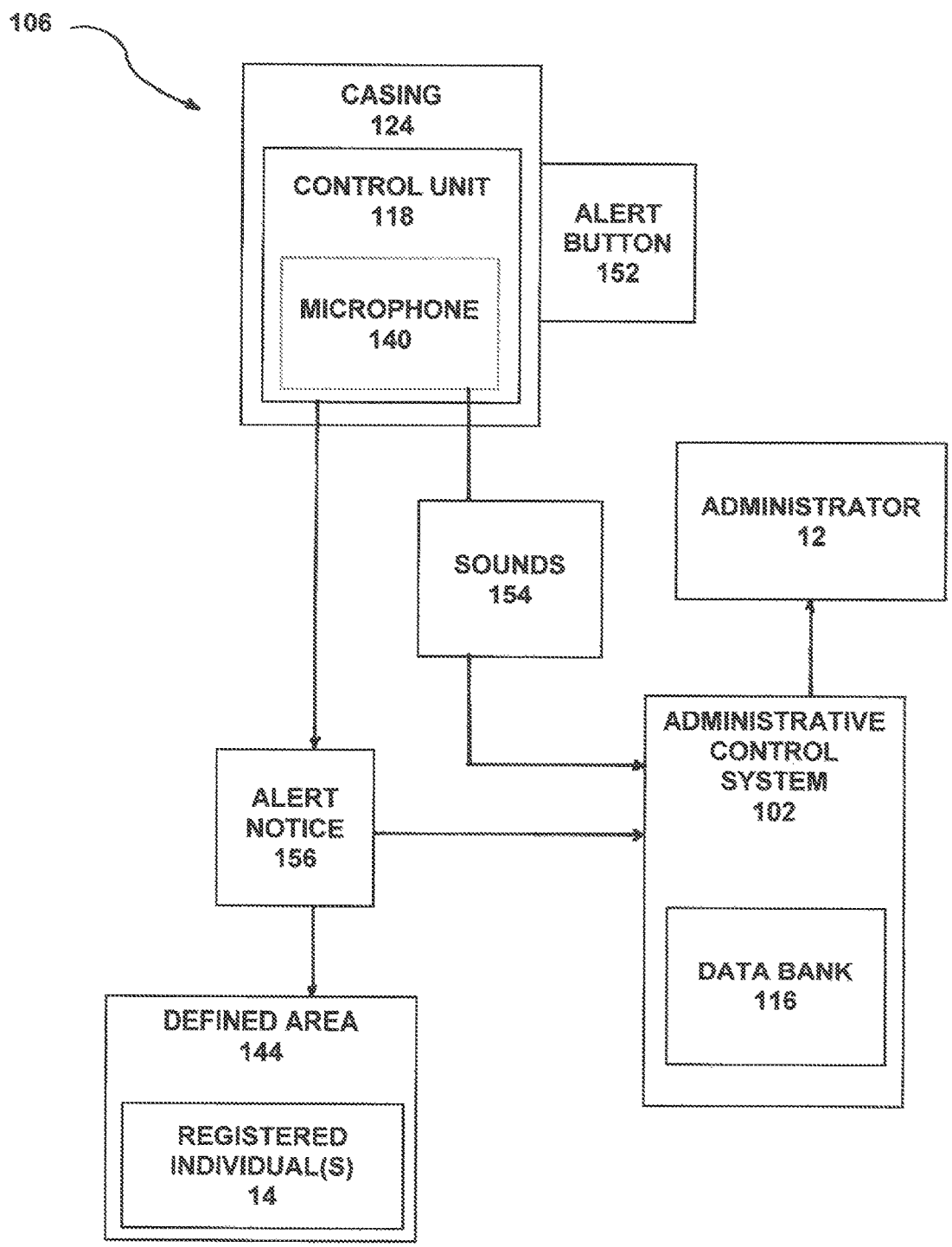
FIG. 13 is a schematic side illustration of a communication apparatus having an alert button that operates to engage a microphone to record sounds and transmit the sounds to the administrative control system and operates to send an alert notice to the administrative control system and/or to one or more registered individuals within a defined area.

In another preferred embodiment, as illustrated in FIGS. 5 and 13, the tasking system 100 further comprises a tracking system 120 that cooperates with the tasking module 204 to track and monitor the location of one or more registered individuals 14. In a preferred embodiment the tracking system 120 for determining the location of a registered individual 14 within a defined area 144 and preferably operates to monitor the movement of a registered individual 14 within the defined area 144 includes one or more sensor nodes 146 and transmitter 147 that operates to transmit tracking information 218 to the administration control system 102. The one or more sensor nodes 146 are placed in position, such as but not limited to the entrance or exit of a defined area 144, and operate with the transmitter 147 to establish communication with the administrative control system 102 when the registered individual 14 enters or is in a predetermined range of the defined area 144. The tracking system 120 utilizing the sensor nodes 146 further operate to monitor the arrival and departure of the registered individual 14 and uses the transmitter 147 to transmits such tracking information 218 to the administrative control system 102 through the communication link 104. The sensor nodes 146 function to receive short-range wireless communication emitted signals or probe request 148 (such as but not limited to WiFi signals, BLUETOOTH signals, NFC signals, and the like) being emitted from an individual's communication apparatus 106, such as a smartphone. These emitted signals 148 from the individual's communication apparatus 106 provide a digital signature or other identifier (i.e. a media access control address (MAC) address). Using tracking information 218 which includes the identity of the sensor node 146 receiving the emitted signals 148, the administrative control system 102 operates to determine a registered individual's current location within the defined area 144 such as by identifying the closest sensor node 146 that is receiving the emitted signals 148 and the time the emitted signal 148 was received. The tracking information 218 is then transmitted by the registered individual's communication apparatus 106 using the communication link 104 to the administrative control system 102 for storage in the data bank 116. It should be understood that other tracking systems, such as a conventional global tracking satellite (GPS) systems or antenna using triangular location systems, that incorporates conventional navigational software to effectively determine the real-time location of the registered individual may also be utilized. As stated, the real-time location of each registered individual 14 within the defined area 144 is transmitted to the administrative control system 102 for monitoring by the administrator 12 and use by the administrative control system 102 in assigning tasks 16. In a preferred embodiment of the invention, as illustrated in FIG. 5, the tasking system 100 includes one or more sensors 150 linked to a transmitter 147, such as motion sensors, positioned within the defined area 144 that detect when a third party 22 enters into or leaves the defined area 144 and transmits the third-party tracking information 218 to the administrative control system 102. The administrative control system 102 then operates to monitor registered individuals 14 who are in close proximity of the third party 22 or are within the same or proximate location or department within the defined area 144 as the third party 22. In this way, when a task is defined (such as providing service to the third party), the administrative control system 102 operates to use the third-party tracking information 218 in identifying qualified registered individuals, such as a registered individual who is the closest registered individual to the third party, or meets other criteria as determined by the administrative control system in selecting for receiving tasking information to provide service (perform a task) to the third party (customer).

Figure 6:
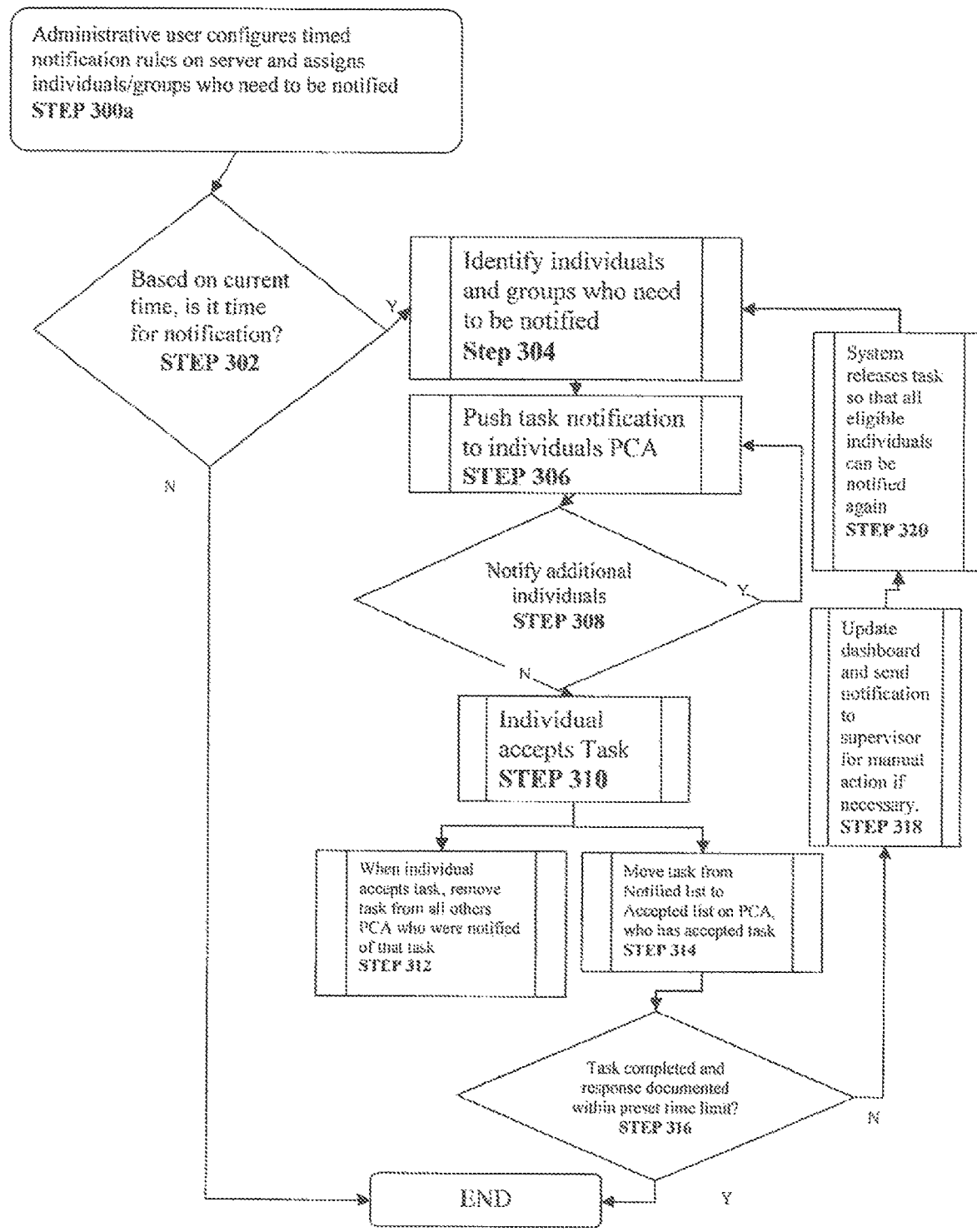
FIG. 6 is the general methodology of the operation of the system software showing the administrator inputting information into the administrative control system whereby notifications are transmitted to registered individuals at a preselected time.
Figure 7:
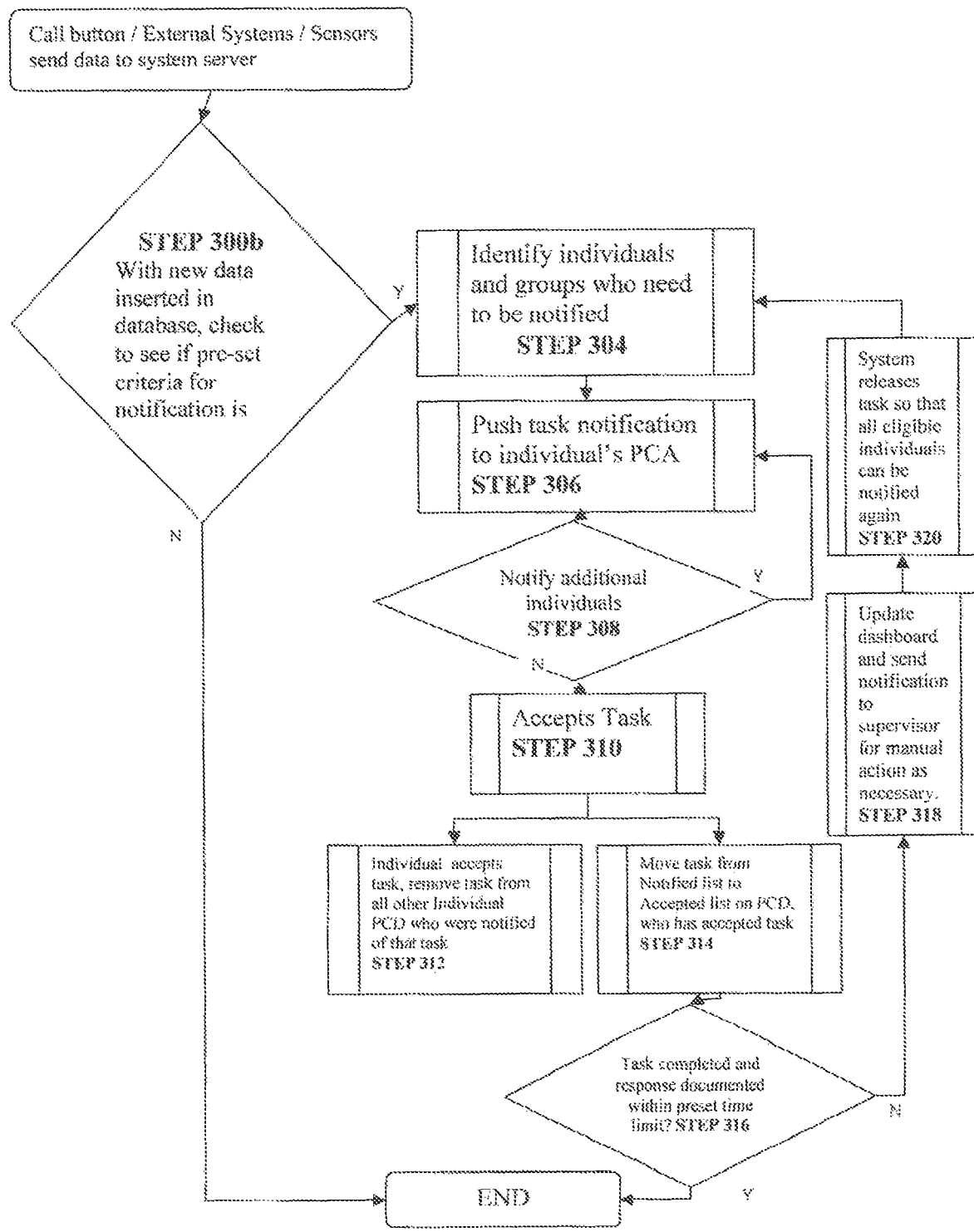
FIG. 7 is the general methodology of the operation of the system software whereby notifications are transmitted to registered individuals in response to sensor information.
Figure 8:
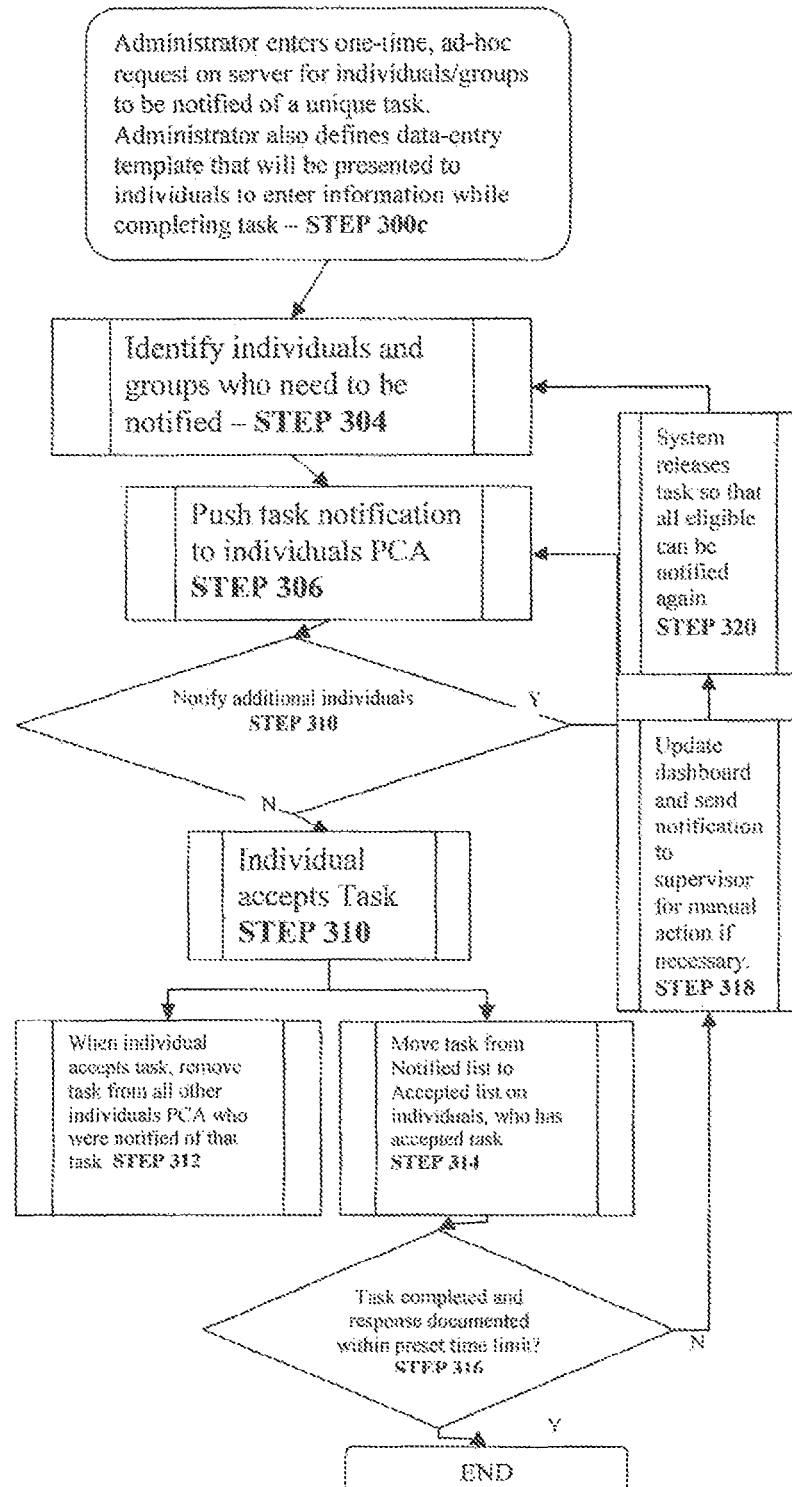
FIG. 8 is the general methodology of the operation of the system software showing the administrator inputs a one-time, ad-hoc unique task information into the administrative control system.

Referring to FIGS. 6, 7 and 8, a preferred operation of the system software 200 is shown whereby tasks are assigned and monitored. In one preferred embodiment, as shown in FIG. 6, an administrator using the administrative control system inputs task information such as task instructions that in this illustrative example includes the identification of the task to be performed and the time that notification of the task (tasking information) that is to be sent to one or more registered individuals (step 300a). The system software then monitors the time (step 302) and at the scheduled time, as provided in the tasking information, operates to identify registered individuals who are qualified to perform the task and are to receive a notification of the task (step 304) and transmit the notification (tasking information) to the identified registered individuals (step 306). In another preferred embodiment, the administrator using the administrative control system inputs tasking information such as in this illustrative example can include instructions that tasking information is to be sent to one or more identified registered individuals based upon the location of the identified registered individual within a defined area based on information transmitted to the administrative control system by the tracking system (step 300b). If the tracking system identified one or more registered individuals that meet certain criteria as provided in the instructions, the system software operates send out tasking information to the identified individual's communication apparatus (stop 304), such as registered individuals in a defined area or having certain qualifications.

In another illustrative example, as shown in FIG. 8, an administrator using the administrative control system inputs a one-time, ad-hoc tasking information concerning a unique task and what information (such as a template) that a registered individual performing the task is to input into the tasking system using the registered individuals' communication apparatus concerning the status of the task (step 300c). The system software then operates to identify one or more registered individuals to be notified of the additional tasking information (step 304).

Referring to FIGS. 6, 7 and 8, once a registered individual is identified by the system software as being a qualified registered individual (for example, a registered individual who is or will be in a defined area at a specific time, has a necessary skill, available to perform the task, and other qualifications) notification of the task and any tasking information are sent to the qualified registered individual's communication apparatus (step 306). The system software continues to identify and send notifications until all of the qualified registered individuals identified by the system software have been notified (step 308). Once the qualified registered individuals have received the notifications, including the tasking information, a qualified registered individual can accept the task (or decline a task) using the registered individual's communication apparatus (step 310) and if the task is accepted, the other qualified registered individuals who received tasking information and were notified of the task, are then notified that the task has been accepted and the identity of the registered individual who accepted the task is displayed on the administrator control system (stop 312). The tasking information, if the task is accepted, is then removed from the other notified qualified registered individual's communication apparatus (step 314). Once the task has been completed, the registered individual completing the task inputs response information into the tasking system using the registered individual's communication apparatus showing the task as being completed (step 316). If the task has not been completed within a specified time limit provided in the tasking information, the system software operates to receive response information inputted by the registered individual using the registered individual's communication apparatus, such as status of the task or if additional support or information is required, or if the registered individual is unable to complete the task (step 318). The system software then operates to transmit the response information to the administrative control system for monitoring and review by the administrator and notifies and sends out tasking information to other qualified registered individuals (step 320). It should be understood that when a group of qualified registered individuals within a network are notified of a task, a qualified registered individual who is first to accept the task, the acceptance is transmitted to the administrative control system and the task information is removed from the other qualified registered individuals' communication apparatus. Preferably, the registered individual who has accepted the task is provided with task information such as a specific amount of time to complete the task. When the task is not completed within the specific amount of time, the system software operates to automatically extends time to complete the task or reassigns the task to another qualified registered Individual or sends out task information to other qualified registered individuals for a qualified registered individual to accept the task. Further, in a preferred embodiment of the invention, the system operates such that response information, such as details of task progress (acceptance/manual reassignment/automatic reassignment/completion/expiry) is presented to the management through the administrative control system, in real-time.

Figure 9:
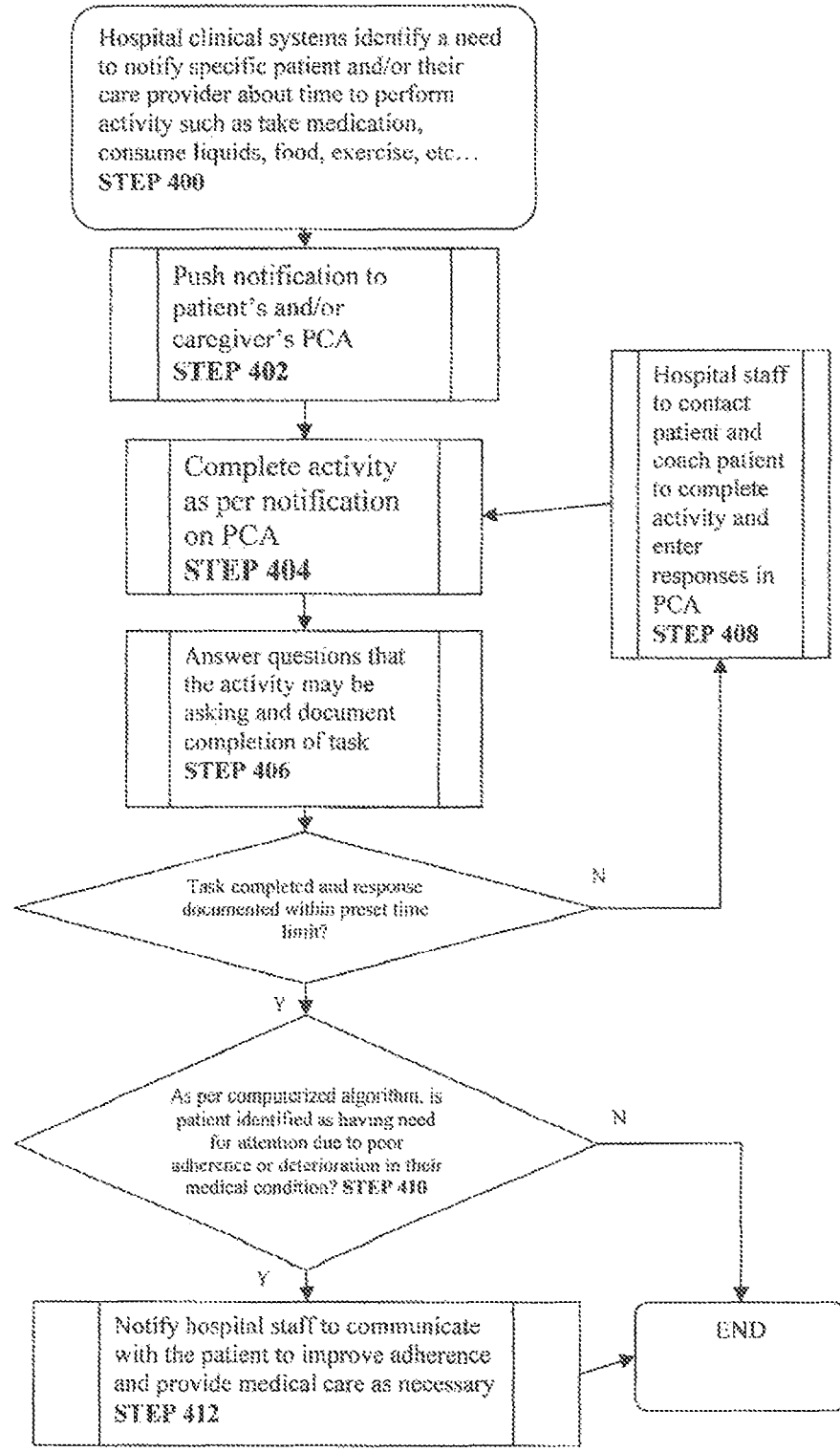
FIG. 9 is the general methodology of the operation of the system software showing the administrator inputting information into the administrative control system for use in the health care industry.

It should now be apparent to one skilled in the art that the tasking system of the subject application can be used for a variety of applications. In one non-limiting exemplary illustration, the tasking system is used in healthcare industry whereby healthcare providers (such as physicians, nurses and ancillary care providers) that are collaborating for care for patients receive tasking information (which may be prioritized by inputted information) from an administrator and whereby the status of each tasks is monitored and recorded. For another illustration, patients are provided with communication apparatus and are identified as registered individuals. Tasking information can then be inputted into the tasking system by the administrator that includes identifying registered individuals (patients) and specific tasks for each registered individual. Such tasks can include, but are not limited to, exercise requirements, medication amounts and times, meal times, and other such tasks. Notifications can then be transmitted to the registered individuals (patients) at the times specified in the information inputted by the administrator. When the registered individual (patient) completes the task, the registered individual transmits the response information using the registered individual's communication apparatus for monitoring by the administrator. In another preferred embodiment, such as shown in FIG. 9, an administrator for a health organization, such as a hospital, identifies registered individuals, such as medical personal or patients, are identified and tasking information is inputted into the administrative control system (step 400). At a time identified in the task information, a notification is transmitted to the registered individual's communication apparatus (step 402). The task is then performed (step 404) and any the registered individuals enters response information into the registered individual's communication apparatus (step 406). If a task is not completed, registered individuals, such as medical personnel, can contact the patient to instruct the patient to complete the activity, such as take a medication (step 408). If a task is completed, the registered individual, such as medical personnel, enters response information into the registered individual's communication system, such as to the status of a patient and within a prescribed time, which is transmitted to the administrative control system for monitoring by the administrator (step 410). The system software then operates to transmit to administrators, registered individuals, and patents information to provide improved health care, such as ensuring the patient takes medication within the prescribed time (step 412).

Other similar uses of the tasking system should now be apparent. In another non-limiting exemplary illustration, the tasking system is used in the retail industry whereby store managers, department managers, sales clerks, associates, stockroom employees and the like (registered individuals) collaborate to provide services for customers. An administrator, such as the store manager, inputs tasking information into the tasking system. In a non-limiting example, the task could include going to a cashier location in high customer demand department or to bring out merchandise from a stockroom. Registered individuals having certain qualifications which are identified by the system software using individual information entered into the system by the administrator are notified and receive tasking information through the registered individual's portable communication apparatus. A registered individual can than accept (or reject) the task using the portable communication apparatus or reject the task. For example, if the registered individual is on a break or already performing a task or not within a defined area. In a preferred embodiment, the system software operates by identifying a registered individual that is best qualified (such as being the closest user to a particular location within a defined area) for that particular task and sends a directed notification and tasking information to that selected registered Individual. If the registered individual declines the task, the system software operates to select the next most qualified registered individual and send the user a notification and tasking information. In another preferred embodiment, the administrative control system communicates through the communication link electronically coupled to a communication connection which provides information for use in identifying and selecting tasks. For example, the communication connection can be various sensors, such as a temperature sensor in a refrigeration unit or a motion sensor in a specific location. The system software can send a notification and tasking information to one or more registered individuals' communication apparatus of a task to be performed based on the information received from the sensors.

In another non-limiting exemplary illustration the tasking system is used in the warehousing industry whereby warehouse employees collaborate to service orders. When an order is received, an administrator can input information, such an order, which creates a task. In a non-limiting example, the task could include placing an order onto a skid or conveyor system. Registered individuals having certain qualifications, such as being nearest the location of the requested stock, are identified by the system software and the selected registered individual (warehouse employee) is notified and tasking information sent through the registered individual's communication apparatus. A registered individual can than accept the task using the communication apparatus or reject the task. When the task (order filled) is completed, the registered individual who performed the task can enter the status into the tasking system using the registered individual's communication device thereby providing a real-time update.

In another non-limiting exemplary illustration the tasking system is used in the construction industry whereby registered individuals (construction workers) collaborate to provide services on a project. An administrator, such as the project manager, inputs tasking information into the tasking system. In a non-limiting example, the task could include creating drawings, providing construction supplies, building an object, and the like. Registered individuals having certain qualifications which are identified by the system software using information entered into the system by the administrator are notified through the registered individual's communication apparatus. A registered individual can than accept the task using the communication apparatus or reject the task. Once a task is completed, the registered individual can communicate the status of the task using the registered individual's communication apparatus (response information) thereby providing real-time monitoring by the administrator. It should also be apparent that other tasks can be assigned to the registered individual at any time and/or as one task is completed; other tasks can be automatically assigned to the registered individual and notification given to the registered individual, thereby reducing time delay.

In another non-limiting exemplary illustration the tasking system is used in various field industries. An administrator inputs tasking information into the tasking system. Registered individuals having certain qualifications, such as being in particular location are identified by the system software using individual information and tasking information and are notified and the tasking information sent through the registered individual's communication apparatus. A registered individual can than accept the task using the communication apparatus or reject the task. In the event the registered individual is unable to accept the task, the system software operates to identify and notifies and sends tasking information to the next qualified registered individual.

In another non-limiting exemplary illustration the tasking system is used in the hospitality (hotel/motel/resort) industry whereby workers collaborate to provide services for customers. An administrator, such as the operations manager, inputs tasking information into the tasking system. In a non-limiting example, the task could include going to the front desk, providing towels or other supplies to a room, repair, and the like. Registered individuals having certain qualifications which are identified by the system software using individual information and tasking information entered into the system by the administrator and are notified and tasking information sent through the registered individual's communication apparatus. A registered individual can than accept the task using the communication apparatus or reject the task. If the task is rejected, the system software identifies and notifies and send tasking information to the next qualified registered individual.

Figure 10:
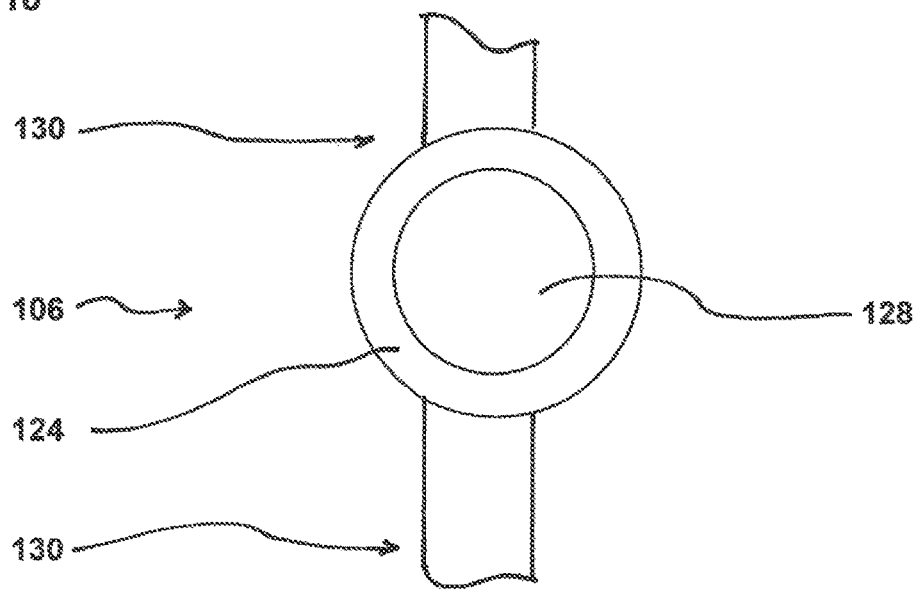
FIG. 10 is a top schematic illustration of an exemplary portable communication apparatus of the tasking system in the form of a wrist watch.
Figure 11:
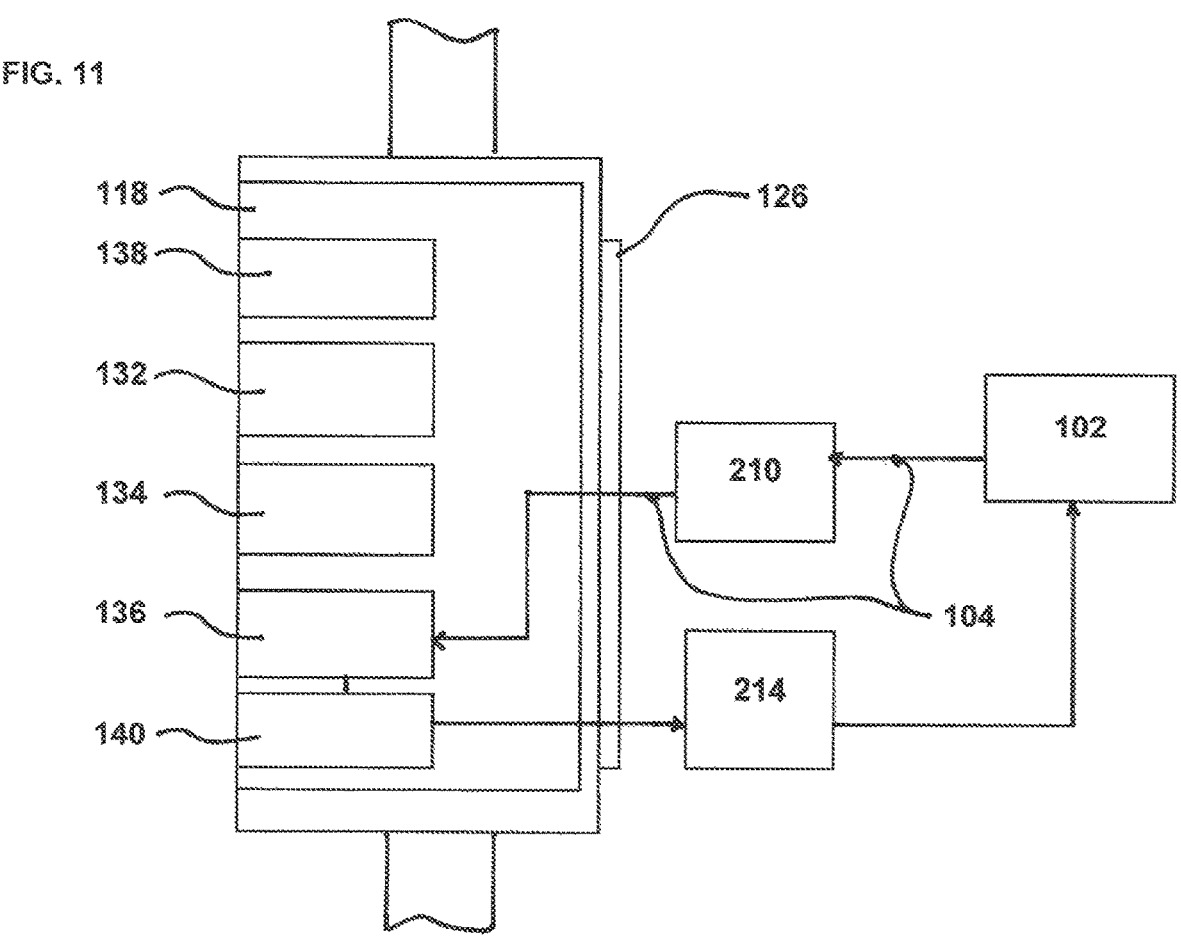
FIG. 11 is a schematic side illustration of a portable communication apparatus of the subject invention that operates to allow for individual hands-free communications with the administrative control system.

In another preferred embodiment of the invention the communication apparatus 106, as shown in FIG. 10, is in the form of a portable hands-free apparatus whereby tasking information can be received without having to hold the apparatus in the registered individual's hand. In a preferred embodiment of the invention, the portable communication apparatus 106 is in the form of an electronic wristwatch having a casing 124, a crystal 126 covering a display 128 (such as an LCD display), and a band 130 for allowing the portable communication apparatus 106 to be worn on the wrist of a registered individual 14. Positioned within the casing 124 is a control unit 118 having a memory 132 and electronically connected to the display 128 and is in communication with the communication link 104. The control unit 118 operates a timing circuit 134 for tracking date and time which is displayed on the display 128. The control unit 118 further includes a communication system 136 that operates to receive tasking information 210 being transmitted by the administrative control system 102 using the communication link 104 and to transmit response information 214 to the administrative control system 102. In a preferred embodiment, the portable communication apparatus 106 further comprises a built-in speaker 138 that operates to allow a registered individual 14 to obtain tasking information 210 in audio form and a built-in microphone 140 that operates to allow a registered individual to input response information 214 by speaking (audio form) and transmit the response information 214. Accordingly, the system allows the registered individual hands-free use of the individual communication apparatus 106. In use, as illustrated in FIGS. 11 and 12, a registered individual 14 receives sound signals 142 that indicate that a notice 216 or tasking information 210 is being displayed on the display 128 and can be visibly read or can be receive the notice by audio using the built-in speaker 138. A registered individual 14 can send response information 214 by inputting the information, such as the status of a task or acceptance or rejection of a task, using the display 128 or verbally inputting the response information 214 by using the built-in microphone 140. In another preferred embodiment, as illustrated in FIG. 13, of the casing 124 of the portable communication apparatus 106 includes an alert button 152 which when activated, such as by pressing, operates the built-in microphone 140 which operates to transmit using the communication link 104 sounds 154, such as conversations or other sounds, to the administrative control system 102 which are recorded and stored in the data bank 116. Preferably, when the alert button 152 is activated it also functions to cause the control unit 118 to send an alert notice 156 to the administrative control system 102 for displaying the alert notice 156 for viewing by an administrator 12. In another preferred embodiment, the alert notice 156 is also transmitted to one or more registered individuals 14 identified as being within the defined area 144 and which identifies the location and the registered individual 14 who's portable communication apparatus transmitted the alert notice 156.

Figure 14:
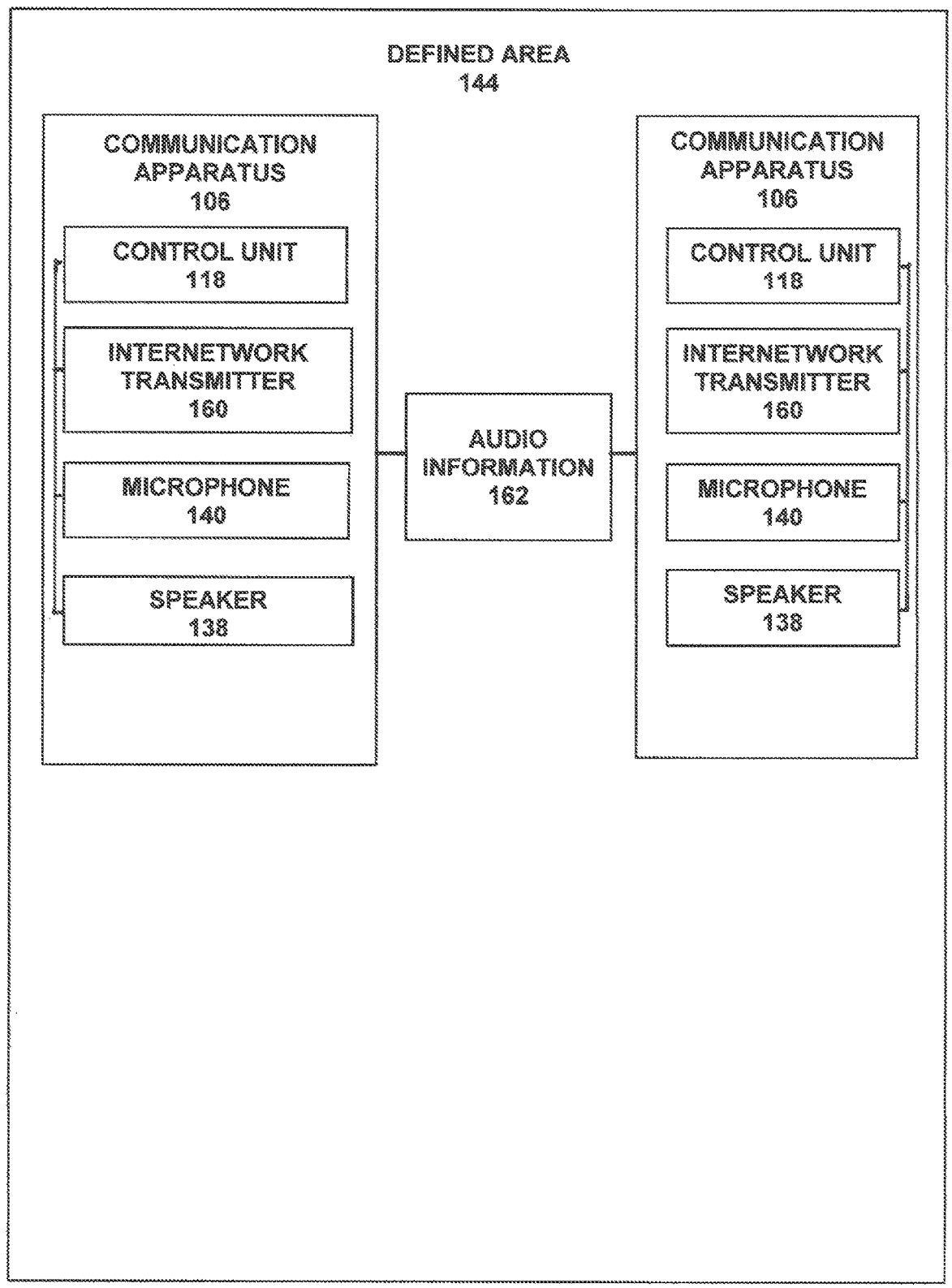
FIG. 14 is a schematic illustration of the tasking system showing a communication apparatus of a registered individual within a defined area operates to directly communicate with communication apparatus of other registered individuals within the defined area.

Preferably, as illustrated in FIGS. 13 and 14, each individual communication apparatus 106 includes an internetwork transmitter 160 that cooperates with the built-in microphone 140, speaker 138 and control 118 to transmit audio information 162 directly between the communication apparatus 106 of registered individuals 14 within a defined area 144. Preferably, each individual communication apparatus within the defined area transmit and receive transmissions operating in a specific frequency thereby eliminating random transmissions. It should be apparent, such direct communication between registered individuals within a defined area provide an effective system for allowing such individuals to request assistance in real time directed specifically to other registered individuals within a defined area.

Figure 15:
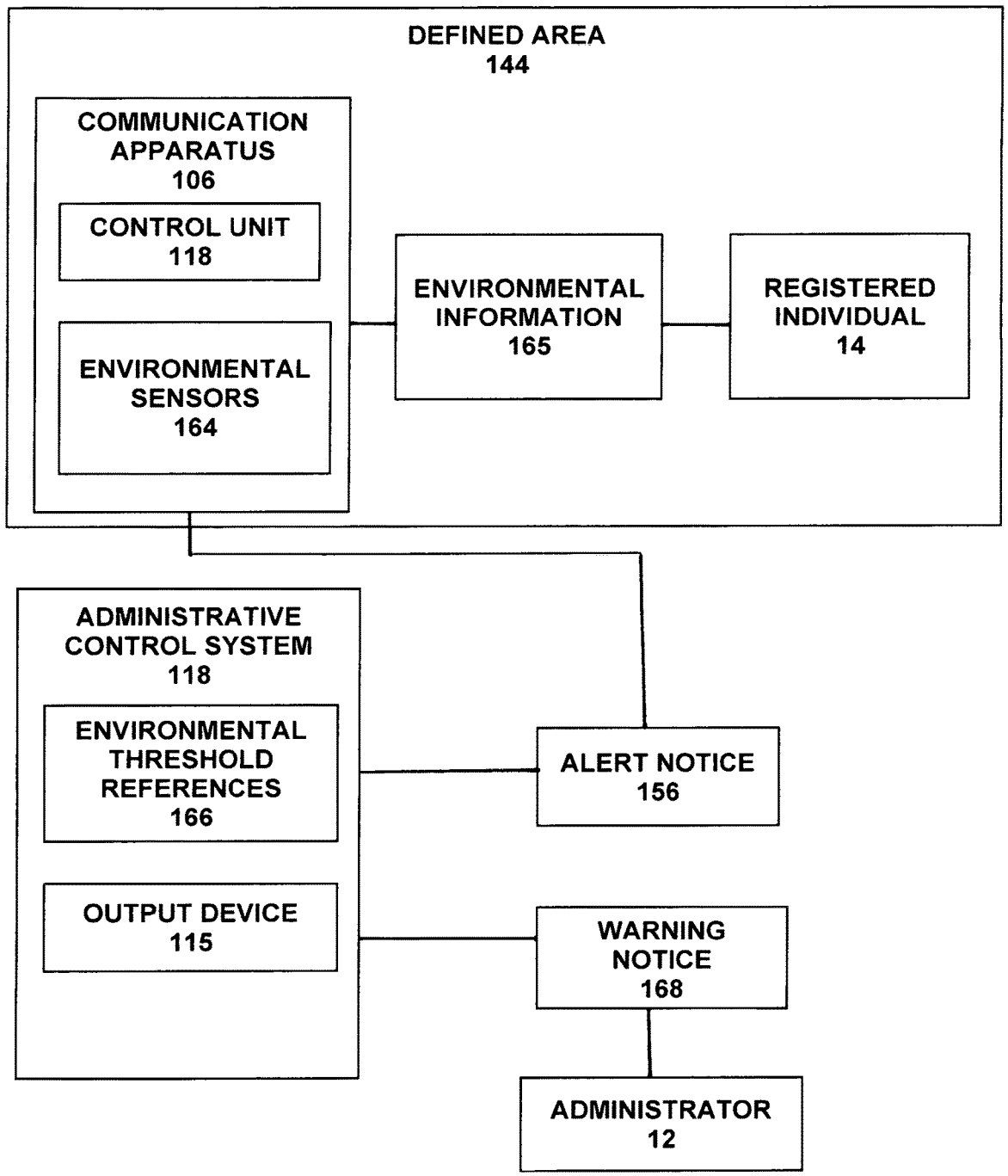
FIG. 15 is a schematic illustration showing a communication apparatus having one or more environmental sensors that operate to obtain environmental information and cooperates with the control unit to transmit the environmental information to the administrative control system.

In a preferred embodiment of the invention as illustrated in FIGS. 1 and 15, the communication apparatus 106 includes one or more environmental sensors 164 such as a temperature sensor, humidity sensor, noise sensors, motion sensors, and the like, that operate to obtain environmental information 165 in the area proximity to the communication apparatus 106 and cooperates with the control unit 118 to transmit the environmental information 165 to the administrative control system 102. The administrative control 102 operates to compare the environmental information 165 to threshold references 166 and if the environmental information 165 exceeds an environmental threshold reference 166 provides a warning notice 168 to the output device 115 for informing the administrator 12. Preferably, if the environmental information 164 exceeds an environmental threshold reference 166, an alert notice 156 is also transmitted to the registered individual's communication device thereby alerting the registered individual 14. It should be understood that the administrative control system 102 can also operate to transmit the alert notice 156 to other register individuals within a defined area 144.

In a non-limiting exemplary illustration the tasking system is used in a manufacturing industry whereby various registered individuals (employees) having various qualifications collaborate to provide services. An administrator inputs individual information concerning the qualifications of the various registered individuals. The administrative control system communicates through the communication link electronically coupled to a communication connection which provides information for use in identifying and selecting tasks such as by use of the communication connection that is in communication with one or more environmental sensors, such as a temperature sensor, humidity sensor, noise sensors, motion sensors, and the like. In response to environmental information transmitted to the administrative control system exceeding an environmental reference, a notification and tasking information is transmitted to one or more registered individual's communication apparatus of a task to be performed based on the environmental information obtained by the individual communication apparatus within a defined area. A registered individual can respond to the tasking information, such as by providing observations, findings, and the like into the system using the registered individual's communication apparatus. For example, by inputting information concerning the environmental conditions within the defined area. In another non-limiting exemplary illustration, if environmental information indicates that the defined area exceeds a certain temperature, the administrations control system can send out an alert notice that the area is now unsafe and should be evacuated.

Figure 16:
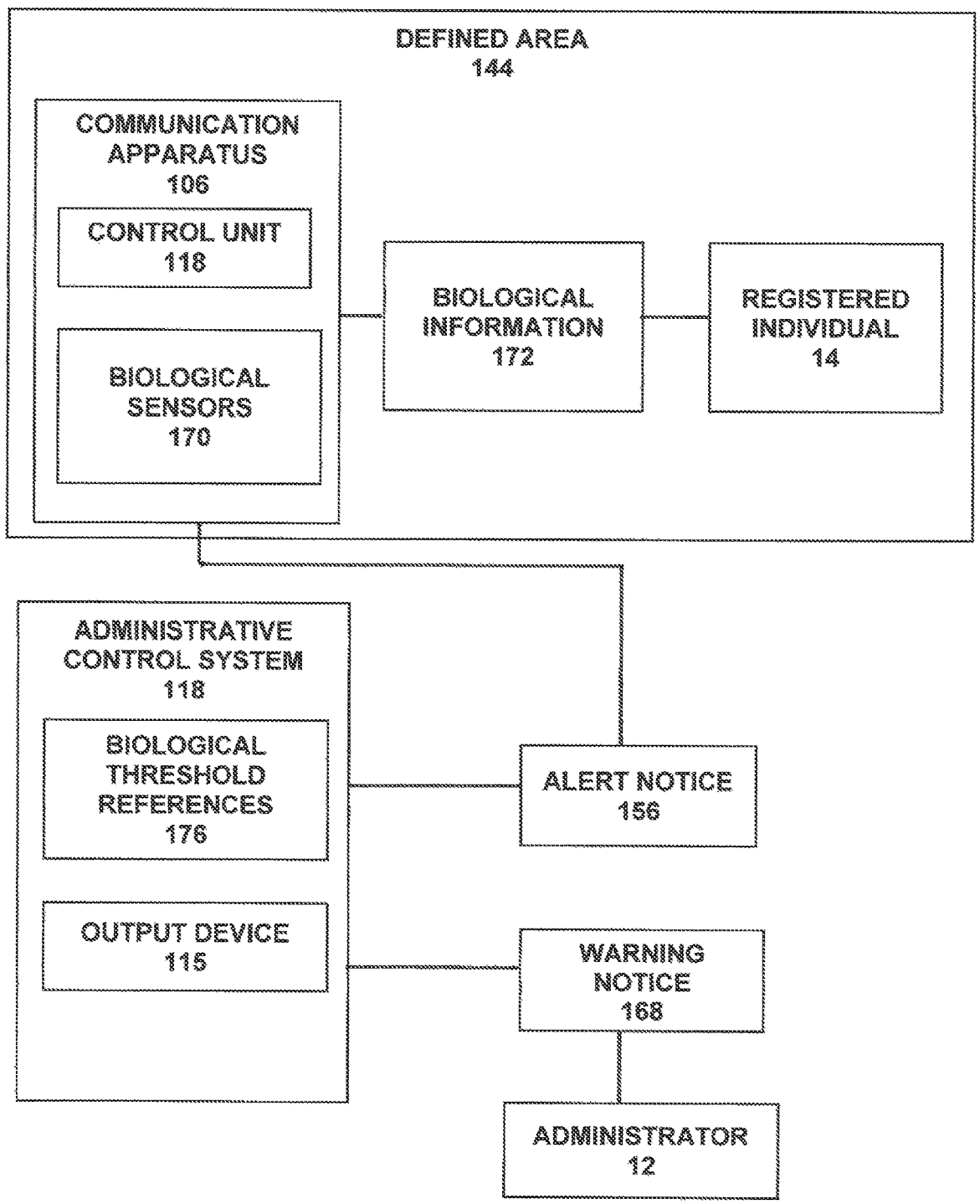
FIG. 16 is a schematic illustration showing a communication apparatus having one or more biological sensors that operate to obtain biological information and cooperates with the control unit to transmit the biological information to the administrative control system.

In a preferred embodiment of the invention as illustrated in FIGS. 1 and 16, the communication apparatus 106, is in the form of a wrist watch and includes one or more biological sensors 170 such as a heartbeat sensor, a body temperature sensor, a blood pressure sensor and the like, that operate to obtain biological information 172 of the registered individual 14 wearing the communication apparatus 106. The biological sensors 170 cooperates with the control unit 118 to transmit the biological information 172 to the administrative control system 102. The administrative control 102 operates to compare the biological information 172 to biological threshold references 174 and if the biological information 172 exceeds a biological threshold reference 176 provides a warning notice 168 to the output device 115 for informing the administrator 12. Preferably, if the biological information 172 exceeds a biological threshold reference 174, an alert notice 156 is also transmitted to the registered individual's communication device thereby alerting the registered individual 14. It should be understood that the administrative control system 102 can also operate to transmit the alert notice 156 to other register individuals within a defined area 144.

In another non-limiting exemplary illustration the tasking system is used in a gaming industry or manufacturing industry or a construction industry, whereby registered individuals are assigned tasks requiring physical activity. As a registered individual performs a task, the biological sensors of the individual's communication apparatus operate to provide biological information to the administrative control system that permits the monitoring of such tasks and the physical condition of the individual. In this way, the tasking system operates to monitor the physical condition of an individual and if the biological information for the individual indicates that the individual is approaching or exceeding certain physical conditions that may be harmful or indicate that the individual is injured or is likely to be injured, a notice is transmitted to the administrator and to other registered individuals in the defined area who can lend assistance.

It should now be apparent to one skilled in the art that the tasking system of the subject invention uses various communication modems to allow management to interact with registered individuals and to assign, track and monitor tasks, the tasking system. In a preferred embodiment the administrative control system includes individual information and tasking information for performing a specified task such that the administrative control system operates to utilize the individual information and the tasking information to identify one or more registered individuals qualified for performing the specified task. One or more communication apparatus in communication with the administrative control system operate to receive tasking information from the administrative control system and transmit response information to the administrative control system. A communication network operates to provide communication between the administrative control system and the one or more individual communication apparatus. The administrative control system further operates to identify one or more qualified registered individuals and transmits tasking information to the one or more qualified registered individuals. An identified qualified registered individual can accept a task and input response information into the administrative control system which operates to receive the task acceptance and response information and then operates to remove the tasking information from individual communication apparatus of other qualified registered individuals. In a preferred embodiment, the tasking system further comprises a tracking system that operates to track the location of one or more registered individuals within a defined area. In another preferred embodiment, the tracking system includes one or more sensor nodes that operate to receive emitted signals from one or more individual communication apparatus to identify one or more registered individuals within a defined area and wherein the tracking system further operates to transmit tracking information to the administrative control system. In one preferred embodiment the one or more individual communication apparatus is in the form of a wrist held device having a communication system having a built-in speaker that operates to allow one or more individuals to receive tasking information in an audio form. In another preferred embodiment the individual communication apparatus is in the form of a wrist held device having a communication system with a built-in microphone that operates to allow one or more individuals to input response information using an audio form. In another preferred embodiment of the invention the one or more individual communication apparatus is in the form of a wrist held device having a control unit and an alert button that when activated operates to direct the control unit to transmit an alert notice to the administrative control system and preferably also transmits an alert notice to one or more individual communication apparatus for registered individuals within a defined area. In a preferred embodiment the alert button further operates when activated to cause the built-in microphone to communicate with the control unit to record sounds and store the sounds in the memory and/or transmit the sounds to the administrative control system. In another preferred embodiment the alert button further operates when activated to send an alert notice to the administrative control system and/or to one or more other registered individuals within the defined area.

It should now be apparent that the tasking system of the subject application allows tasks to be assigned in a collaborative manner, either to the nearest registered individual or to a designated registered individual or to a group of registered individuals who are assigned to a service area (defined area), such as on a floor of a hospital, or area of a store or warehouse, and the like. The tasking system provides registered individuals with connectivity and access to tasking information and to provide response information while the registered individual remains hands free to fulfill primary job responsibilities.

It should also now be apparent that the tasking system of the subject invention permits businesses to utilize the benefits of the system. Businesses can use the system to allow management to track a registered individual's current location and the individual's ability and/or availability to perform a task. It should also now be apparent to one skilled in the art that in a preferred embodiment of the invention the tasking system of the subject invention automatically tracks the location of registered individuals and to send out tasking information to qualified registered individuals, assign and monitor tasks. It should also now be understood that in another preferred embodiment the system software operates to transmit to qualified registered individuals tasks and task information and allows qualified registered individuals to accept or reject a task and to provide response information concerning the task and the status of the task. The tasking system further operates to allow qualified registered individuals who decline a task whereby the system operates to identify and notify one or more other alternate qualified registered individuals who can accept and perform a task.

Although the foregoing Invention has been described in some detail for purposes of clarity of understanding, it should be apparent that certain changes and modifications may be practiced within the scope of the appended claims. Furthermore, it should be noted that there are alternative ways of implementing the method and article for implementing the method of the present invention. Accordingly, the present embodiments and examples are to be considered as illustrative and not restrictive, and the invention is not to be limited to the details given herein, but may be modified within the scope and equivalents of the appended claims.

The invention claimed is:

1. A tasking system that uses various communication modems to allow management to interact with one or more registered individuals and to assign, track and monitor tasks assigned to a qualified registered individual, the tasking system comprising:
   an administrative control system having individual information and tasking information for performing a task;
   one or more communication apparatus in communication with said administrative control system and operates to receive tasking information from said administrative control system and transmitting response information to said administrative control system;
   a communication network for providing communication between said administrative control system and said one or more individual communication apparatus;
   a tracking system that operates to track the location of one or more registered individuals within a defined area and transmits tracking information to said administrative control system;
   wherein said administrative control system operates to identify qualified registered individuals based on said individual information, said tasking information and said tracking information and transmits a task and tasking information to said one or more qualified registered individuals;
   wherein at least one communication apparatus operates to receive said task and said tasking information from said administrative control system and transmits an acceptance and any response information from one said qualified registered individual who accepted said task to said administrative control system;
   at least one said one or more portable communication apparatus includes one or more biological sensors that operates to obtain biological information of said qualified registered individual who accepted said task when performing said task and transmits said biological information to said administrative control system whereby said administrative control system then operates to compare said biological information to a biological threshold reference that indicates when an individual is approaching or exceeding a physical condition that may be harmful and if said biological information exceeds said biological threshold, said administrative control system transmits a warning notice to an output device to inform an administrator and to said qualified registered individual who accepted said task and is performing said task and a notice to other said registered individuals within said defined area to lend assistance in performing said task; and
   wherein when said administrative control system receives said acceptance of said task it operates to remove said tasking information from individual communication apparatus of other said identified qualified registered individuals.

2. The tasking system of claim 1 further comprising one or more motion sensors that operates to detect a third party, who is not a registered individual, entering the defined area and transmits the detection of said third party to said administrative control system whereby said administrative control system then operates to identify said qualified registered individuals based in said third party entering said defined area and sends tasking information to the identified qualified registered individuals for performing a task for said third party.

3. The tasking system of claim 1 wherein said tracking system includes one or more sensor nodes that operate to receive emitted signals from said one or more individual communication apparatus to identify said one or more registered individuals within the defined area.

4. The tasking system of claim 1 wherein said at least one individual communication apparatus is in the form of a wrist held device having a built-in speaker that operates to allow said one or more qualified registered individuals to receive tasking information in audio form and further having a microphone that operates to receive response information in audio form from said one or more qualified registered individuals.

5. The tasking system of claim 1 wherein said one or more individual communication apparatus includes one or more environmental sensors that operates to obtain environmental information for an area within said defined area and transmits said environmental information to said administrative control system and wherein said administrative control system operates to compare said environmental information to environmental threshold references and if said environmental information exceeds an environmental reference threshold said administrative control system operates to provide a warning to an output device that operates to inform an administrator and further operates to send a warning to said one or more registered individuals within said defined area.

6. The tasking system of claim 1 wherein said one or more individual communication apparatus is in the form of a wrist held device having a control unit and an alert button that when activated by a registered individual said alert button operates to direct said control unit to transmit an alert notice to said administrative control system and to said registered individuals within said defined area.

7. The tasking system of claim 6 wherein said alert button further operates to activate a built-in microphone that communicates with said control unit to record sounds and transmit said sounds to said administrative control system and to each said one or more communication apparatus within said defined area.

8. The tasking system of claim 1 further comprising environmental sensors that operate to send environmental information to said administrative control system and said administrative control system then operates to compare said environmental information with one or more environmental reference thresholds and if one or more said environmental thresholds are exceeded, said administrative control system sends a task based on said environmental information to one or more qualified registered individuals.

9. The tasking system of claim 1 wherein said individual information includes a registered individuals name, qualifications and scheduling information as to when said registered individual is scheduled to be within said defined area.

10. The tasking system of claim 9 wherein said alert button further operates to direct said control unit to send an alert notice to said administrative control system and so each said one or more communication apparatus within said defined area.

11. The tasking system of claim 1 wherein said tasking information includes a time that said task is to be performed and if said task is not performed by said time, said administrative control system then operates to send said task and said tasking information to alternate identified registered individuals who can then accept said task.

12. The tasking system of claim 1 wherein each task is assigned a priority and whereby task information is transmitted to said one or more qualified registered individuals based on said assigned priority and the location of said one or more qualified registered individuals with the defined area.

13. The tasking system of claim 1 wherein said tasking information includes a target time for completing said task and wherein said identified qualified registered individual who accepts said task inputs response information into said one or more communication apparatus which operates to transmit said response information to said administrative control system and wherein if said qualified registered individual who accepted said task is unable to complete said task or if said task is not completed by said target time said administrative control system operates to send a notice and said task and tasking information to other said qualified registered individuals.

14. A tasking system that uses various communication modems to allow management to interact with registered individuals and to assign, track and monitor tasks, the tasking system comprising:
an administrative control system having individual information and tasking information for performing a specified task;
one or more portable communication apparatus in communication with said administrative control system and operates to receive a specified task and said tasking information from said administrative control system and for transmitting response information to said administrative control system;
a tracking system that operates to track the location of one or more registered individuals;
one or more motion sensors that operates to detect a third party who is not a registered individual and transmits the detection of the third party to said administrative control system;
a communication network for providing communication between said administrative control system and said one or more portable communication apparatus;
wherein when said administrative control system receives the detection of the third party, said administrative control system operates to identify one or more qualified registered individuals based on said specified task and said tasking information and transmits said specified task and said tasking information to said one or more qualified registered individuals based on the location of each qualified registered individual and the detection of the third party;
wherein said one or more portable communication apparatus operates such that said identified qualified registered individual obtains said task and said tasking information and operates to receive acceptance of said specified task and response information from said identified qualified registered individual using said portable communication apparatus further operates to transmit said acceptance of said specified task and said response information to said administrative control system; and
wherein said administrative control system operates to receive said acceptance of said specified task and said response information and then operates to remove said specified task and said tasking information from portable communication apparatus of other qualified registered individuals.

15. The tasking system of claim 14 wherein said at least one said one or more communication apparatus includes one or more environmental sensors that operates to obtain environmental information of an area in a defined area and proximate to said one or more communication apparatus and transmits said environmental information to said administrative control system and wherein said administrative control system operates to compare said environmental information to environmental threshold references and if said environmental information exceeds an environmental reference said administrative control system operates to provide a warning to an output device that operates to inform an administrator and further operates to send a warning to one or more registered individuals within said defined area.

16. The tasking system of claim 14 wherein said tracking system includes one or more sensor nodes that operate to receive emitted signals from said one or more individual communication apparatus to identify said one or more registered individuals and wherein said tracking system further operates to transmit tracking information to said administrative control system.

17. The tasking system of claim 14 wherein said one or more individual communication apparatus is in the form of a wrist held device having a control unit and an alert button that when activated operates to direct said control unit to transmit an alert notice to said administrative control system and to each said one or more individual communication apparatus of registered individuals within a defined area.

18. The tasking system of claim 17 wherein said alert button further operates to activate a built-in microphone that communicates with said control unit to record sounds and transmit said sounds to said administrative control system and to at least one other of said one or more communication apparatus within a defined area.

19. The tasking system of claim 14 wherein said at least one said one or more portable communication apparatus includes one or more biological sensors that operates to obtain biological information of said qualified registered individual performing a task and transmits said biological information to said administrative control system wherein said administrative control system operates to compare said biological information to biological threshold references and if said biological information exceeds a biological threshold reference said administrative control system operates to transmit a warning notice to said output device for informing said administrator and transmits an alert notice to said at least one or more portable communication apparatus requesting a registered individual within a defined area to lend assistance to said qualified registered individual performing said task.

20. A tasking system that uses various communication modems to allow management to interact with registered individuals and to assign, track and monitor tasks, the tasking system comprising:
   an administrative control system having individual information and tasking information for performing a specified task;
   one or more portable communication apparatus in communication with said administrative control system;
   a communication network for providing communication between said administrative control system and said one or more portable individual communication apparatus;
   a tracking system that operates to track the location of one or more registered individuals within a defined area;
   one or more motion sensors that operates to detect a third party who is not a registered individual entering said defined area and transmits the detection information to said administrative control system;
   wherein said administrative control system operates to identify one or more qualified registered individuals based on a task to be performed, the location of one or more registered individuals with said defined area and if detection of a third party that is not a registered individual has been transmitted to said administration control system and then operates to transmit said task and tasking information to said one or more identified qualified registered individuals using said communication network;
   wherein said one or more portable communication apparatus is a hands-free apparatus and operates to receive said task from said administrative control system and task information and transmits said acceptance and response information to said administrative control system;
   wherein at least one of said one or more portable communication apparatus comprises a speaker that operates such that said qualified registered individual receives said task and tasking information in audio form and a microphone that operates for inputting response information;
   wherein at least one said one or more portable communication apparatus further includes an alert button which when activated by a registered individual records sounds and transmits said sounds to said administrative control system and further operates to direct said at least one said one or more communication apparatus to transmits an alert notice to other portable communication apparatus of other registered individuals in a defined area, wherein said alert notice includes the identification and the location of said registered individual user that activated said alert button;
   wherein said at least one said one or more communication apparatus also includes one or more environmental sensors that operates to obtain environmental information of an area within the defined area and proximate to one or more communication apparatus and transmits said environmental information to said administrative control system wherein said administrative control system then operates to compare said environmental information to environmental threshold references and if said environmental information exceeds an environmental threshold reference said administrative control system transmits a warning to an output device for informing an administrator and transmits an alert notice to one or more communication apparatus within said defined area;
   wherein said at least one said one or more portable communication apparatus includes one or more biological sensors that operates to obtain biological information of said identified registered individual who accepted said task and performing said task and transmits said biological information to said administrative control system wherein said administrative control system operates to compare said biological information to biological threshold references and if said biological information exceeds a biological threshold reference said administrative control system operates to transmit a warning notice to said output device for informing said administrator and transmits an alert notice to said identified qualified individual performing said task and to each registered individual within said defined area that said qualified registered individual performing said task needs assistance; and
   wherein said administrative control system receives said task acceptance and response information and then operates to remove said tasking information from individual communication apparatus of other qualified registered individuals.

21. A tasking system that uses various communication modems to allow management to interact with one or more registered individuals and to assign, track and monitor tasks assigned to a qualified registered individual, the tasking system comprising:
   an administrative control system having individual information and tasking information for performing a task;
   one or more communication apparatus in communication with said administrative control system and operates to receive a task and tasking information from said administrative control system and transmitting response information to said administrative control system;
   a communication network for providing communication between said administrative control system and said one or more individual communication apparatus;
   a tracking system that operates to track the location of one or more registered individuals within a defined area and transmits tracking information to said administrative control system; and
   one or more environmental sensors that operates to obtain environmental information of an area within said defined area and transmits said environmental information to said administrative control system wherein said administrative control system then operates to compare said environmental information to environmental threshold references and if said environmental information exceeds an environmental threshold reference said administrative control system uses said environmental information, said tracking information and individual information to identify a task and for identifying qualifying registered individuals to perform said task;

wherein at least one communication apparatus operates to receive said task and said tasking information from said administrative control system and an identified qualified registered individual can then respond to accept said task and input the acceptance of the task and any response information into said at least one communication apparatus and wherein said at least one communication apparatus operates to transmits said acceptance of said task and any said response information to said administrative control system.

* * * * *